(12) United States Patent
Nottingham et al.

(10) Patent No.: US 8,127,663 B2
(45) Date of Patent: *Mar. 6, 2012

(54) APPARATUS FOR BREWING AND METHOD FOR MAKING THE SAME

(75) Inventors: John R. Nottingham, Bratenahl, OH (US); John Spirk, Gates Mills, OH (US); Marc L. Vitantonio, South Russell, OH (US); Jeffrey Kalman, Cleveland Heights, OH (US); Kenneth Wulff, Aurora, OH (US)

(73) Assignee: Nottingham Spirk Design Associates, Inc., Cleveland, OH (US)

( * ) Notice: Subject to any disclaimer, the term of this patent is extended or adjusted under 35 U.S.C. 154(b) by 608 days.

This patent is subject to a terminal disclaimer.

(21) Appl. No.: 12/263,729

(22) Filed: Nov. 3, 2008

(65) Prior Publication Data
US 2009/0050623 A1    Feb. 26, 2009

Related U.S. Application Data

(63) Continuation of application No. 10/937,720, filed on Sep. 9, 2004, now Pat. No. 7,444,926.

(51) Int. Cl.
*A47J 31/00* (2006.01)
(52) U.S. Cl. ............................. 99/295; 99/299; 99/306
(58) Field of Classification Search .............. 99/299, 99/295, 306, 304; 426/77, 82; 53/410, 411, 53/420, 427, 434, 449, 464, 469
See application file for complete search history.

(56) References Cited

U.S. PATENT DOCUMENTS
2,243,895 A    6/1941    Brown
(Continued)

FOREIGN PATENT DOCUMENTS
EP    177281    8/1990
(Continued)

OTHER PUBLICATIONS

International Search Report and Written Opinion from PCT/US04/41966 dated Apr. 29, 2005.

(Continued)

*Primary Examiner* — Reginald L Alexander
(74) *Attorney, Agent, or Firm* — Calfee, Halter & Griswold LLP

(57) ABSTRACT

Apparatus for brewing a brew substance with a liquid comprises: a container for storing the liquid, the container including at least one aperture for dispensing liquid therefrom; a sealed packet of filter paper containing the brew substance; and a layer of heat sensitive film encapsulating the sealed packet, the encapsulated packet disposed within the container at a position covering the at least one aperture, the container configured to sit on top of a drinking container to permit liquid to drain into the drinking container from the at least one aperture thereof. In addition, a method of making a brewing apparatus comprises the steps of: configuring a container to store liquid for brewing and to dispense the liquid through at least one aperture therein; encapsulating a sealed packet of filter paper containing a brew substance with a layer of heat sensitive film; disposing the encapsulated packet within the container at a position covering the at least one aperture; and configuring the container to sit on top of a drinking container to permit liquid to drain into the drinking container from the at least one aperture thereof.

49 Claims, 16 Drawing Sheets

U.S. PATENT DOCUMENTS

| | | | |
|---|---|---|---|
| 2,283,967 A | 5/1942 | Brown |
| 2,732,787 A | 1/1956 | Osborne |
| 2,835,587 A | 5/1958 | Maggiore |
| 3,589,272 A | 6/1971 | Bouladon et al. |
| 3,743,520 A | 7/1973 | Croner |
| 3,868,218 A | 2/1975 | Tommarck et al. |
| 3,985,069 A | 10/1976 | Cavalluzzi |
| 4,104,957 A | 8/1978 | Freedman et al. |
| 4,132,239 A | 1/1979 | Bowen et al. |
| 4,134,492 A | 1/1979 | Lucas |
| 4,136,202 A | 1/1979 | Favre |
| 4,167,899 A | 9/1979 | McCormick |
| 4,170,956 A | 10/1979 | Wear |
| 4,190,077 A | 2/1980 | Bowen et al. |
| 4,233,325 A | 11/1980 | Slangan et al. |
| 4,303,196 A | 12/1981 | Raines et al. |
| 4,306,492 A | 12/1981 | Zimmermann |
| 4,345,512 A | 8/1982 | Moore |
| 4,381,696 A | 5/1983 | Koral |
| 4,386,109 A | 5/1983 | Bowen et al. |
| 4,421,053 A | 12/1983 | Volk |
| 4,446,158 A | 5/1984 | English et al. |
| 4,577,080 A | 3/1986 | Grossman |
| 4,596,713 A | 6/1986 | Burdette |
| 4,627,334 A | 12/1986 | Shanklin |
| 4,721,835 A | 1/1988 | Welker |
| 4,756,915 A | 7/1988 | Dorbry |
| 4,762,056 A | 8/1988 | Virag |
| 4,800,089 A | 1/1989 | Scott |
| 4,806,371 A | 2/1989 | Mendenhall |
| 4,908,222 A | 3/1990 | Yu |
| 4,920,868 A | 5/1990 | Gehrmann |
| 4,987,280 A | 1/1991 | Kanafani et al. |
| 4,990,734 A | 2/1991 | Hirsch |
| 4,999,470 A | 3/1991 | Fuchs, Jr. |
| 5,010,221 A | 4/1991 | Grossman et al. |
| 5,012,059 A | 4/1991 | Boatman |
| 5,028,753 A | 7/1991 | Shariat |
| 5,046,409 A | 9/1991 | Henn |
| 5,049,713 A | 9/1991 | Creyaufmuller |
| 5,064,980 A | 11/1991 | Grossman et al. |
| 5,095,185 A | 3/1992 | Fuchs, Jr. |
| 5,185,505 A | 2/1993 | Grzywana |
| 5,240,722 A | 8/1993 | Louridas |
| 5,243,164 A | 9/1993 | Erickson et al. |
| 5,300,308 A | 4/1994 | Louridas |
| 5,325,880 A | 7/1994 | Johnson et al. |
| 5,605,710 A | 2/1997 | Pridonoff et al. |
| 5,747,782 A | 5/1998 | Orrico et al. |
| 5,832,809 A | 11/1998 | Gras |
| 5,880,441 A | 3/1999 | Hartman et al. |
| 5,884,551 A | 3/1999 | Orrico et al. |
| 5,942,143 A | 8/1999 | Hartman et al. |
| 6,065,609 A | 5/2000 | Lake |
| 6,229,128 B1 | 5/2001 | Policappelli |
| 6,260,476 B1 | 7/2001 | Pope |
| 6,298,771 B1 | 10/2001 | Calvento |
| 6,354,190 B1 | 3/2002 | Haydon |
| 6,589,577 B2 | 7/2003 | Lazaris et al. |
| 6,641,882 B1 | 11/2003 | Shibata |
| 6,727,484 B2 | 4/2004 | Policappelli |
| 6,808,083 B2 | 10/2004 | Roekens et al. |
| 6,889,599 B2 | 5/2005 | Koslow |
| 7,021,198 B1 | 4/2006 | Lyall, III |
| 7,444,926 B2 | 11/2008 | Nottingham et al. |
| 2005/0211102 A1 | 9/2005 | Vu et al. |

FOREIGN PATENT DOCUMENTS

| | | |
|---|---|---|
| EP | 1169957 | 1/2002 |
| JP | 01-227722 | 9/1989 |
| JP | 2648926 | 9/1997 |
| KR | 2001-0096453 | 11/2001 |
| WO | 92/10919 | 6/1992 |
| WO | 95/07648 | 3/1995 |
| WO | 2005/058725 | 6/2005 |

OTHER PUBLICATIONS

Office action from U.S. Appl. No. 10/937,720 dated Apr. 13, 2007.
Response from U.S. Appl. No. 10/937,720 dated Oct. 17, 2007.
Four pages from www.javavoo.com printed Sep. 12, 2006.
One page article printed on Sep. 12, 2006, "Micro brew/cup gains ground for java", from packagingdigest.com.
One page article dated Jul. 4, 2006, Consumer technology news, "Pressurized Coffee Cup Nearing Launch", Piranet.com.
Office action from U.S. Appl. No. 10/937,720 dated Dec. 11, 2007.
Response from U.S. Appl. No. 10/937,720 dated Jun. 11, 2008.
Notice of Allowance from U.S. Appl. No. 10/937,720 dated Jun. 30, 2008.
Office action from Canadian Application No. 2,548,575 dated Feb. 25, 2011.
Office action from Chinese Application No. 200480041286.2 dated Nov. 7, 2008.
Response from Chinese Application No. 200480041286.2 dated May 22, 2009.
Office action from Chinese Application No. 200480041286.2 dated Jan. 11, 2011.
Communication from EP Application No. 04814179.0 dated Apr. 2, 2009.
Response from EP Application No. 04814179.0 dated Oct. 8, 2009.
Office action from Mexican Application No. PA/a/2006/006416 dated Mar. 9, 2009.
Response from Mexican Application No. PA/a/2006/006416 dated Jul. 10, 2009.
Article from USA Today, Dec. 19, 2003, one page, At home, Trends, "Cup of coffee just for me".
Two page article from Inc. Magazine, Jan. 2004, Case Study, "Taking a Niche Player Big-Time".
One page article dated Jul. 2006, Consumer Convenience, "Microwave Coffee-Brewing Cup".
One page article dated May 17, 2006, "JavaVoo for you".
Two page article copyright 2006, The Seattle Times Company, "Look out Starbucks, JavaVoo is out there!".
One page article dated May 19, 2006, "Industry's first innovative Micro-Brew technology, experience the indesposable true pressure brew cup of Espresso or Latte", BevNet.com.
One page article dated May 22, 2006, Packaging Management Update, "Single-serve packs double as cooking vessel".
Office action from Korean Application No. 10-2006-7013887 dated Sep. 26, 2011.

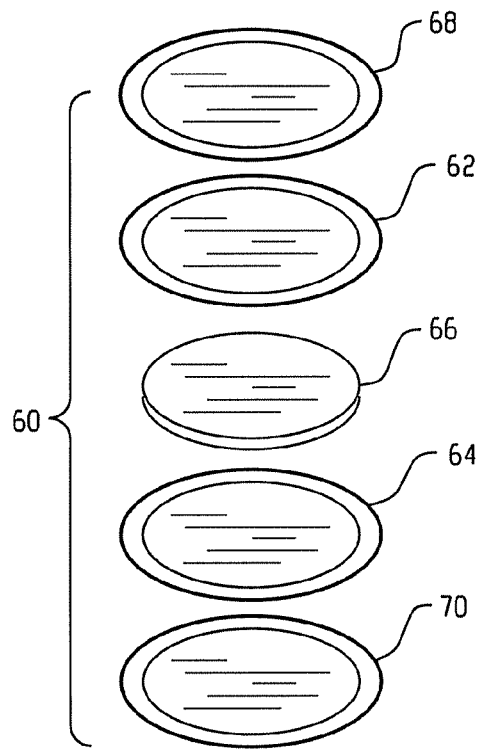
Fig. 9
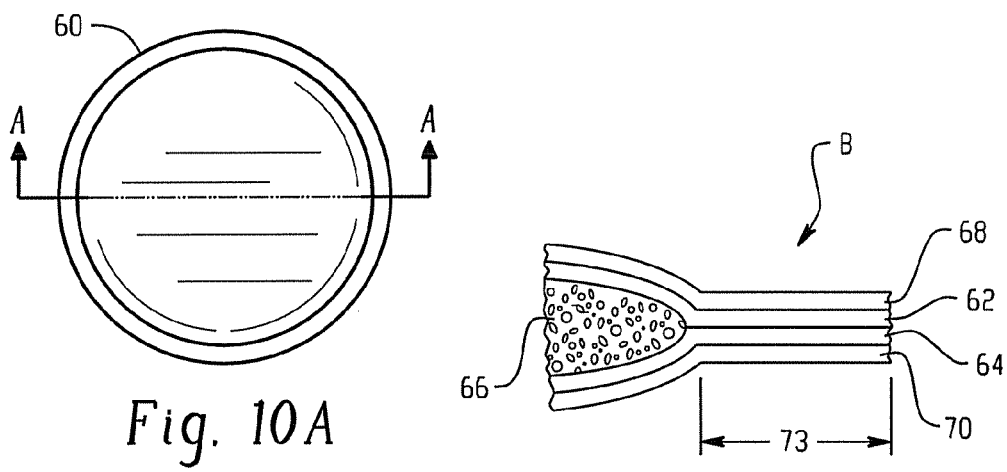
Fig. 10A
Fig. 10C
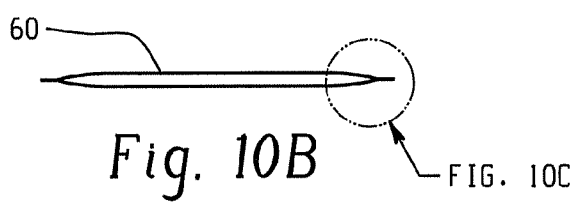
Fig. 10B

APPARATUS FOR BREWING AND METHOD FOR MAKING THE SAME

This utility application is a continuation of and claims the benefit of the filing date of U.S. patent application Ser. No. 10/937,720 (filed on Sep. 9, 2004), and also claims the benefit of the filing dates of U.S. Provisional Application Nos. 60/501,292 (filed Sep. 9, 2003), 60/528,547 (filed Dec. 10, 2003), and 60/546,518 (filed Feb. 20, 2004), and the entire contents of all such applications are incorporated by reference herein.

BACKGROUND OF THE INVENTION

The present invention is directed to brewing apparatus in general, and more particularly, to apparatus suitable for use in a microwave oven for brewing a brew substance into a liquid and a method of making such apparatus.

Disposable microwavable coffee brewers suitable for a one-cup serving have been described in the literature. In these brewers, water is added to a water reservoir and the brewer with water is placed over the consumer's cup or mug which is of any known type for receiving a hot beverage. The brewer and cup are then placed in a microwave oven wherein microwave brewing at appropriate settings may take approximately 5 or less minutes. During the brewing operation, the water is heated in the reservoir and at the desired temperature, the water is mixed with a charge of coffee in a brew chamber below the reservoir. The brewed coffee is eventually dispensed by gravity from the brew chamber into the drinking container.

One such microwavable coffee brewer is disclosed in U.S. Pat. No. 5,243,164, entitled "Beverage Maker" which was granted Sep. 7, 1993 to Erickson et al. In the Erickson brewer, a liquid reservoir includes at least one aperture at the bottom thereof for dispensing a brewed liquid into a drinking container. Filter paper is disposed over the at least one aperture at the bottom of the reservoir and a charge of coffee grinds is disposed over the filter paper. A partition of heat responsive film is disposed over the charge of coffee grinds and attached to the inside circumference of the reservoir to prevent liquid within the reservoir from mixing with the coffee grinds until the liquid reaches the proper temperature.

To brew coffee with the Erickson brewer, the reservoir is filled with a proper amount of water and disposed over a drinking cup or mug. Then, the reservoir and cup are placed into a microwave oven which is set to start with the desired settings for heating. As the temperature of the water reaches the melting temperature of the partition material, the partition ruptures and exposes the water to the coffee grinds for brewing. The brewed coffee releases by gravity to the cup through the filter paper and at least one aperture of the reservoir.

While the Erickson brewer mentions the use of a nitrogen purged (i.e. filled) retail bag for keeping multiple assembles preserved, the individual brewers, particularly their respective coffee charges, are not individually sealed. Accordingly, the freshness of the coffee will begin to degrade as soon as the multiple unit package is ruptured. Also, the Erickson brewer permits flow-through brewing immediately upon rupture of the partition, thereby prohibiting a gradual wetting of the grounds prior to the introduction of the brewing liquid into the serving cup. This absence of gradual wetting may allow air pockets to remain in both the grounds and the paper which, in turn, has the potential of compromising the extraction process in and around these air pockets.

Still further, the Erickson brewer provides no provisions for a filter paper layer above the grounds. One drawback of this design is that buoyant grounds may rise into the liquid reservoir, in turn, mitigating the hydraulic drag of the grounds remaining in the brew chamber and permitting a higher flow rate which eventually results in less extraction. Another drawback of this design is that the grounds should be retained and held where the fluid head pressure is the greatest (i.e. as low as possible relative to the centroid of the reservoir). Buoyant grounds floating on or near the surface of the liquid do not have the benefit of head pressure to aid in the extraction process. Moreover, the appearance of grounds in the liquid reservoir is aesthetically undesirable, and, if the reservoir is to be reused, a cleaning burden.

Accordingly, the present invention overcomes the foregoing described drawbacks of the current brewers by providing improved brewing apparatus and a method making the same.

SUMMARY OF THE INVENTION

In accordance with one aspect of the present invention, apparatus for brewing a brew substance with a liquid comprises: a container for storing the liquid, the container including at least one aperture for dispensing liquid therefrom; a sealed packet of filter paper containing the brew substance; and a layer of heat sensitive film encapsulating the sealed packet, the encapsulated packet disposed within the container at a position covering the at least one aperture, the container configured to sit on top of a drinking container to permit liquid to drain into the drinking container from the at least one aperture thereof.

In accordance with another aspect of the present invention, a method of making a brewing apparatus comprises the steps of: configuring a container to store liquid for brewing and to dispense the liquid through at least one aperture therein; encapsulating a sealed packet of filter paper containing a brew substance with a layer of heat sensitive film; disposing the encapsulated packet within the container at a position covering the at least one aperture; and configuring the container to sit on top of a drinking container to permit liquid to drain into the drinking container from the at least one aperture thereof.

In accordance with yet another aspect of the present invention, apparatus for brewing a brew substance with a liquid comprises: a container for storing the liquid, the container including at least one aperture for dispensing liquid therefrom; an encapsulated packet of heat sensitive film containing the brew substance; and a layer of filter paper covering the encapsulated packet to form a subassembly, the subassembly disposed within the container at a position covering the at least one aperture, the container configured to sit on top of a drinking container to permit liquid to drain into the drinking container from the at least one aperture thereof.

In accordance with yet another aspect of the present invention, a method of making a brewing apparatus comprises the steps of: configuring a container to store liquid for brewing and to dispense the liquid through at least one aperture therein; encapsulating a brew substance with a layer of heat sensitive film; covering the encapsulated brew substance with filter paper to form a subassembly; disposing the subassembly within the container at a position covering the at least one aperture; and configuring the container to sit on top of a drinking container to permit liquid to drain into the drinking container from the at least one aperture thereof.

BRIEF DESCRIPTION OF THE DRAWINGS

FIGS. 5A-5C are top, side and isometric views of a heat sensitive film layer suitable for use in the embodiment of FIG. 1.

FIGS. 6A and 6B are more detailed, cut-away illustrations of portions of the assembled brewing apparatus of FIG. 6.

FIG. 9 is a break away, isometric illustration of components of a subassembly containing brewing substance suitable for use in an embodiment of another aspect of the present invention.

FIGS. 10A-10C are top, side and detailed cross-sectional views of the assembled subassembly depicted in FIG. 9.

DETAILED DESCRIPTION OF THE INVENTION

Figure 1:
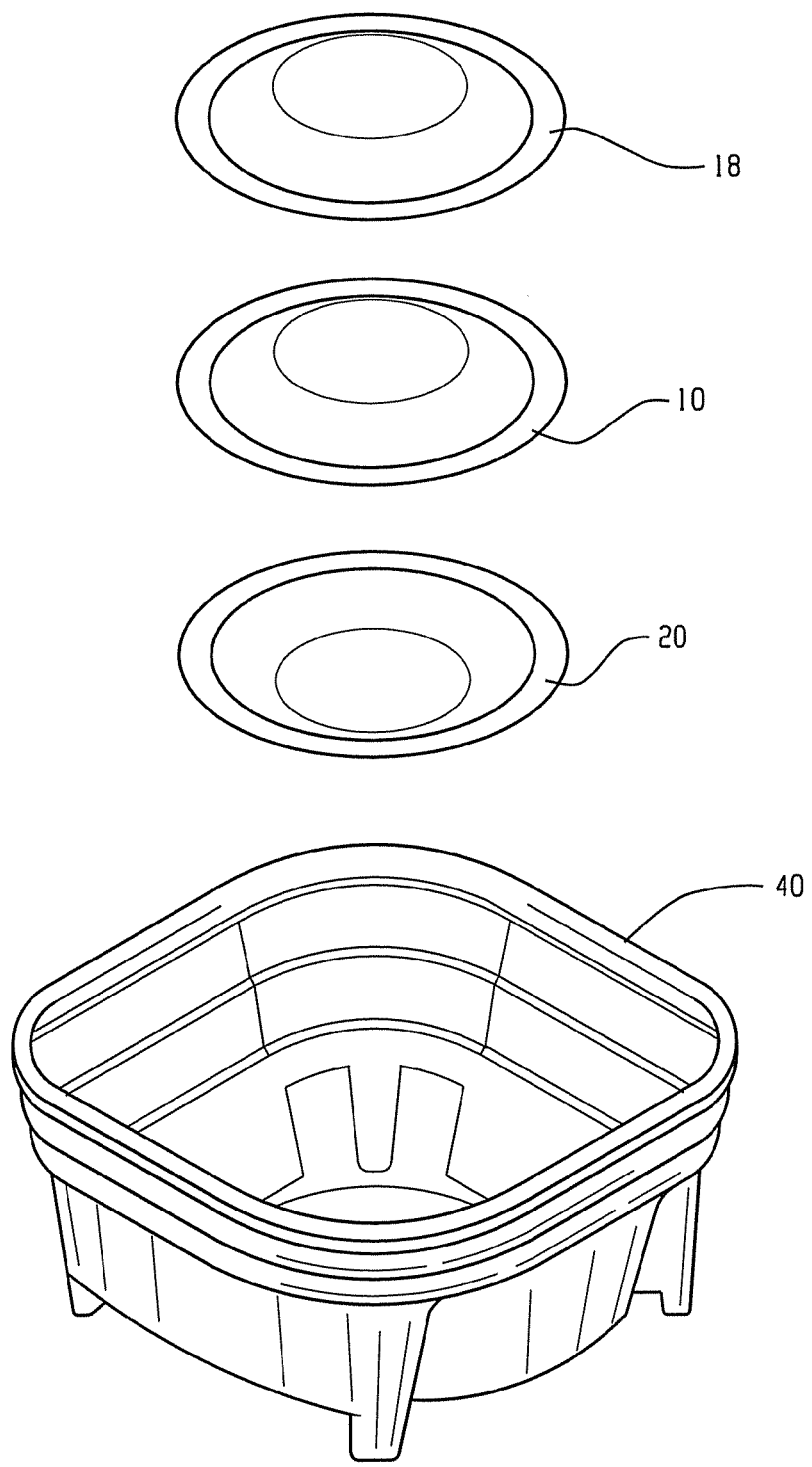
FIG. 1 is a break away, isometric illustration of components of a brewing apparatus suitable for embodying one aspect of the present invention.

A suitable embodiment of one aspect of the present invention is depicted in the FIGS. 1 through 6B. FIG. 1 is a break-away, isometric drawing of components of a brewing apparatus suitable for use in a microwave oven. Referring to FIG. 1, a packet 10 contains a brew substance (not shown) which may be coffee grinds, ground tea leaves, chocolate or other flavored powder and the like, for example. The brew substance may even include a combination of dry milk and sugar or sugar substitute. The different views of FIGS. 4A-4C provide more detailed depictions of a suitable brew substance packet 10. As shown in the cross-sectional view of FIG. 4B, the brew substance is contained within top and bottom filter paper layers 12 and 14, respectively.

Generally, the filter paper layers 12 and 14 may be comprised of manila hemp, cellulose and thermoplastic fibers, for example. The paper material of Crompton #474604 or comparable was found to provide a suitable filter paper layer. Other suitable filter paper characteristics include a weight of 21.0 mg per square inch, air permeability of 50 $m^3$ per minute per square meter, a thickness of 89 microns, a wet burst strength of 22 kPa, a dry tensile strength of MD 98 g/mm and CD 34 g/mm, and a seal strength potential of 377 g/50 mm. Preferably, the paper should be food grade compliant to FDA standards 21 CFR 176.170.

Figure 4A:
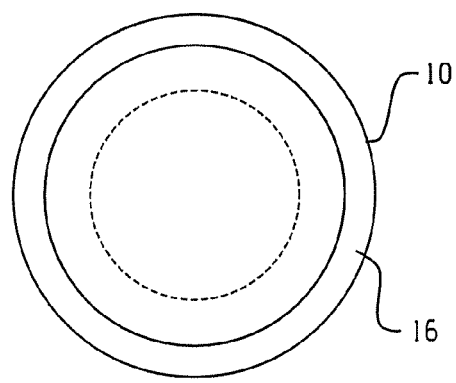
FIGS. 4A-4C are top, side and isometric views of a sealed packet of filter paper for containing a brewing substance suitable for use in the embodiment of FIG. 1.
Figure 4B:
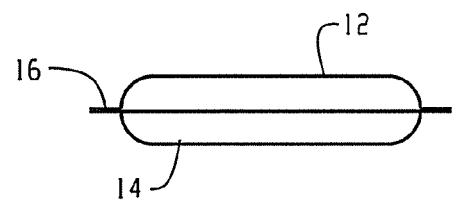
Figure 4C:
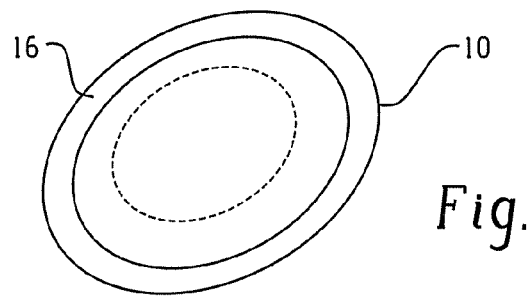

The filter paper layers 12 and 14 may be in the form of circles having a diameter of approximately 2.9 inches, for example, as shown in FIGS. 4A-4C. The brew substance may be disposed over the bottom paper layer 14, preferably forming a pile with the highest point at the center of the paper 14. The top paper layer 12 may be disposed over the brew substance with its circumference edge aligned with the circumference edge of paper 14. The top and bottom paper layers 12 and 14 may be sealed together around the circumference thereof to form the packet 10 with a relatively flat annular rim 16 of approximately 0.25 inches wide and having a thickness of approximately 8 mils, for example. The sealing process may be performed by any of the known commercial methods. FIG. 4C depicts the resultant exemplary packet 10 in a 3-dimensional isometric view.

Returning to FIG. 1, the brewing apparatus includes top and bottom layers 18 and 20, respectively, made of a heat sensitive film. In the present embodiment, the top and bottom layers 18 and 20 are of the same or similar shape. Views of an exemplary top or bottom heat sensitive film layer are shown in the FIGS. 5A-5C to provide greater detail thereof. However, it is understood that the film layers 18 and 20 do not have to be preformed into dome shapes as shown prior to integration with the coffee packet. The film layers 18 and 20 may be flat, circular blanks that "wrinkle" slightly as they are integrated with the packet 10. A suitable heat sensitive material for film layers 18 and 20 is ethylene vinyl acetate which is a copolymer film having a thickness of approximately 0.00225 inches (0.057 mm), for example. Such a material is marketed commercially under the trade name of LOMEL by J.D. Rasner & Co. of Beachwood, Ohio, U.S.A. which is food grade compliant to FDA standards. The top and bottom film layers 18 and 20 may be manufactured to melt or rupture at different temperatures. For example, the top film layer 18 may be manufactured to rupture at approximately 160° F. and the bottom film layer 20 manufactured to rupture at approximately 180° F. It is understood that other rupture temperatures may be used for the top and bottom film layers 18 and 20 without deviating from the broad principles of the present invention.

Figure 1A:
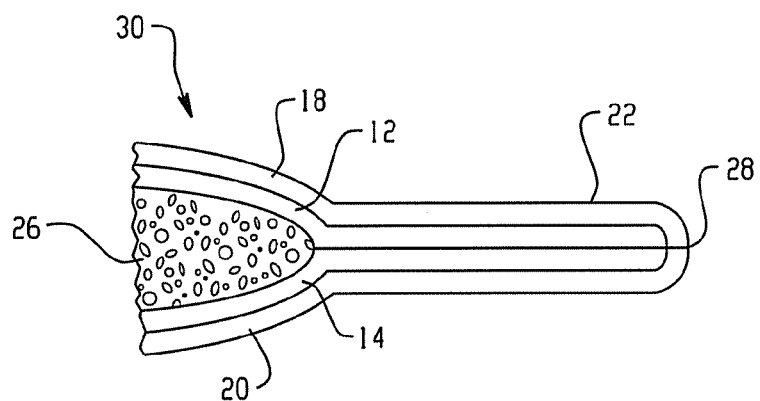
FIG. 1A is a cross-sectional illustration of an encapsulated packet of a brewing substance suitable for use in the embodiment of FIG. 1.

As shown in FIGS. 5A-5C, each top and bottom film layer 18 and 20 may be shaped as a circle of approximately 2.9 inches in diameter with a relatively flat rim 22 of an approximate width of 0.25 inches around the circumference thereof, for example. The center section 24 of each film layer 18 and 20 may be shaped to conform substantially to the shape of the packet 10 so that the top and bottom film layers 18 and 20 may be disposed over the respective top and bottom surfaces of packet 10 as shown in the cut-away cross-sectional illustration of FIG. 1A. However, as explained in the paragraph directly above, the film layers 18 and 20 may take upon other shapes without deviating from the broad principles of the present invention. Referring to FIG. 1A, the film layers 18 and 20 may be heat sealed around the circumference of the rims 22 thereof to form a sealed seam 28. This may be accomplished by any of the well-known heat sealing techniques like ultrasonic heating, for example. The packet 10 containing the brew substance 26 may be thus sealed within the film layers 18 and 20 to form an encapsulated sub-assembly 30 of the brew substance 26. The process of encapsulating the brew substance in the sub-assembly 30 as described herein above may be performed in a nitrogen environment.

Returning to FIG. 1, the brewing apparatus further includes a brew basket or container 40. In the present embodiment, the container 40 may be made of a high impact polystyrene material approximately 0.020 inches thick and configured in a square or rectangular cross-sectional shape which is tapered in cross-sectional area from top to bottom. Exemplary dimensions of the container 40 for the present embodiment include approximately 4.7 inches per side at the top with a height of approximately 2.1 inches. While the present embodiment uses a rectangular cross-sectional shape for the container 40, it is understood that other cross-sectional shapes may be used, like a cylindrical shape, for example, without deviating from the broad principles of the present invention. The container 40 may include a variety of different shaped contours along the sides and bottom to provide added structural strength and for design purposes.

Figure 2:
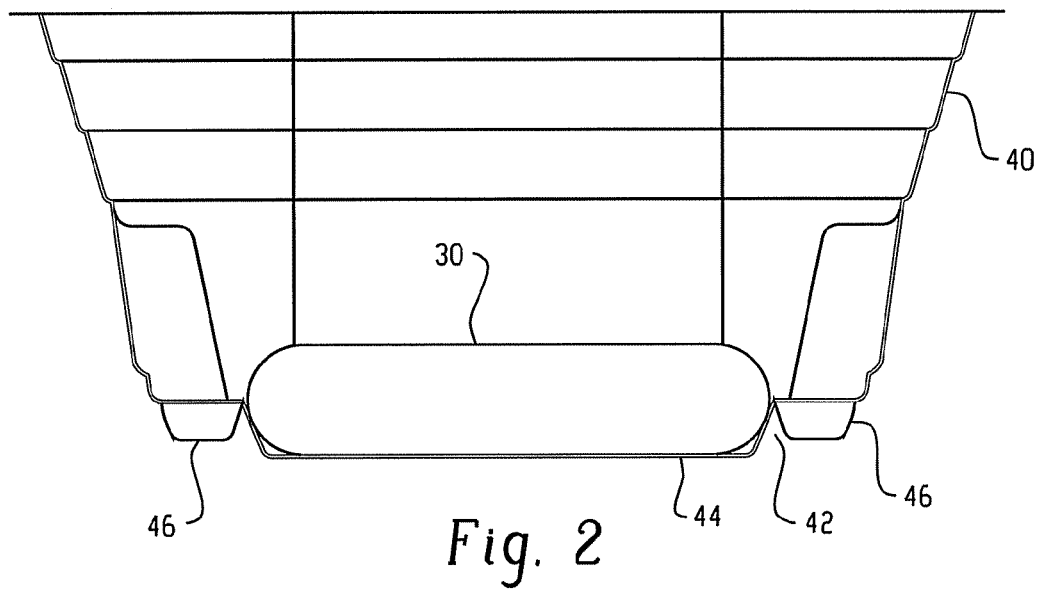
FIG. 2 is a cross-sectional illustration of an assembled brewing apparatus in accordance with the inventive aspect depicted in FIG. 1.
Figure 3:
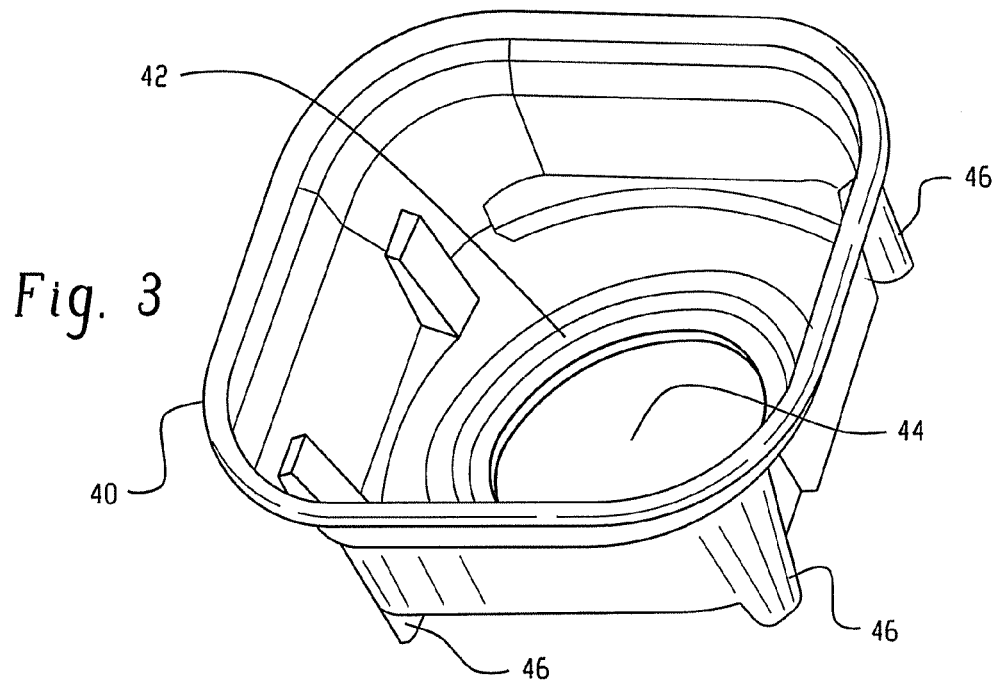
FIG. 3 is an isometric view of a brewing container suitable for use in the embodiment of FIG. 1.
Figure 6:
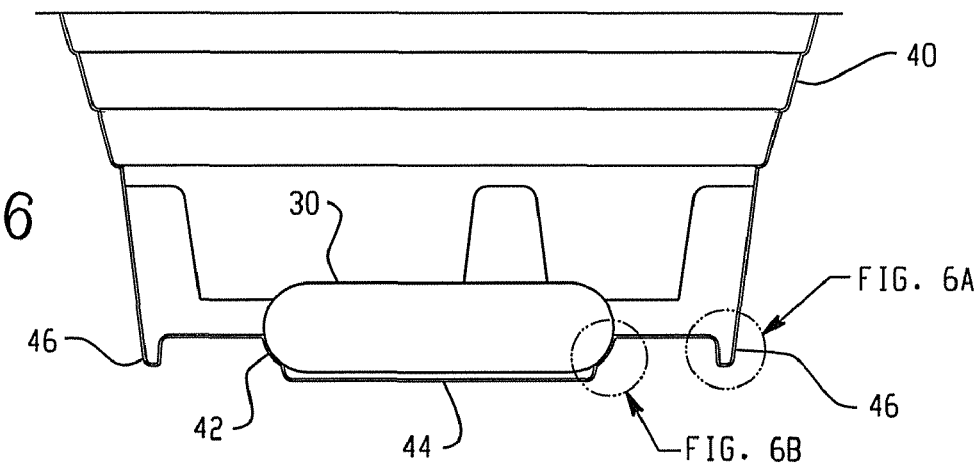
FIG. 6 is another cross-sectional view of an assembled brewing apparatus suitable for embodying an aspect of the present invention.

At the bottom of the brew container 40 is a cavity 42 which is shown more clearly in the cross-section view of FIG. 2 and isometric view of FIG. 3. The cavity 42 may be configured in a frusto-conical shape in the present embodiment to accommodate the sub-assembly 30 as shown in FIG. 2, but other shapes will suffice as well. At the bottom of the cavity 42 is an aperture 44 which may be circular in configuration and encompass a substantial portion of the bottom portion of the cavity 42 as shown in FIG. 3. FIGS. 6, 6A and 6B depict the container 40 of the present embodiment in greater detail. FIG. 6 is another cross-sectional view of the container 40 showing protrusions or feet 46 extending from the bottom surface and on which the container 40 may rest in an upright orientation. The feet 46 may also be seen in FIGS. 2 and 3. The cross-sectional illustration of FIG. 6A reveals one of the feet 46 in greater detail.

In the present embodiment, the feet 46 are disposed along the outer bottom edge and aligned substantially with the four corners of the rectangular cross-section of the container 40. However, it is understood that the feet 46 may be disposed around the bottom edge in any pattern of separation. While four feet 46 are depicted in the present embodiment, it is understood that three feet 46 may be used just as well so long as they are suitably separated from each other around the outer bottom edge of container 40.

To complete the assembly of the brewing apparatus, the sealed sub-assembly 30 is disposed in the cavity 42 as shown in the cross-sectional views of FIGS. 2 and 6. As shown in FIG. 6B which is a more detailed cut-away, cross-sectional view of the sub-assembly 30 resting in the cavity 42, the rim 22 of the sub-assembly 30 is seated circumferentially around an edge 50 of the bottom surface of the container 40. Note that the weight of the sub-assembly 30 creates a seal against the side walls of the cavity 42 during a brewing process as will become better understood from the description found herein below. Alternatively, the packet 10, film layers 18 and 20 and container 40 may be integrated in a single step.

Figure 7:
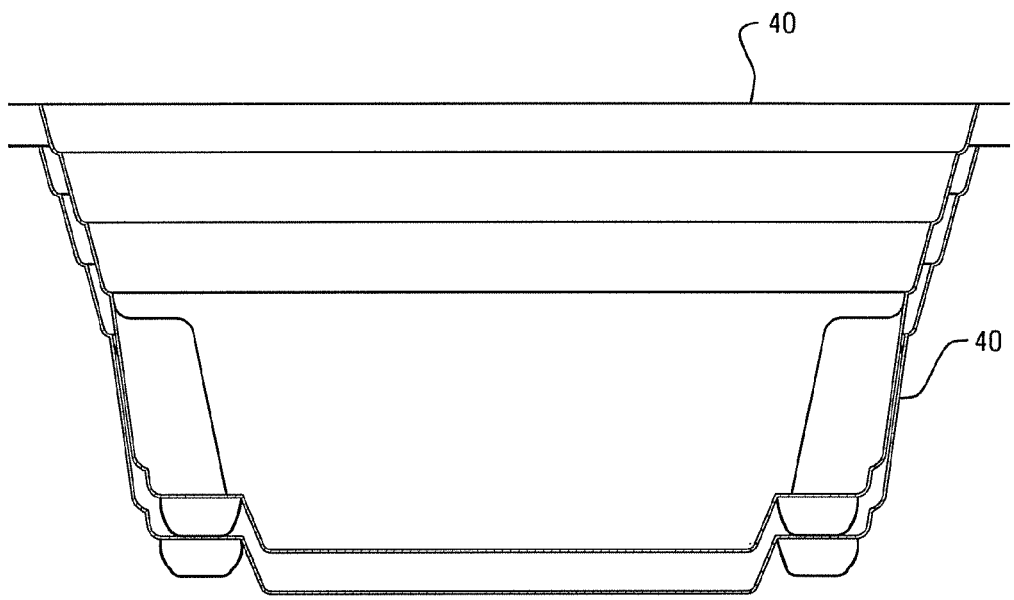
FIG. 7 is an illustration depicting a nesting of containers suitable for use in the embodiment of FIG. 1.
Figure 8:
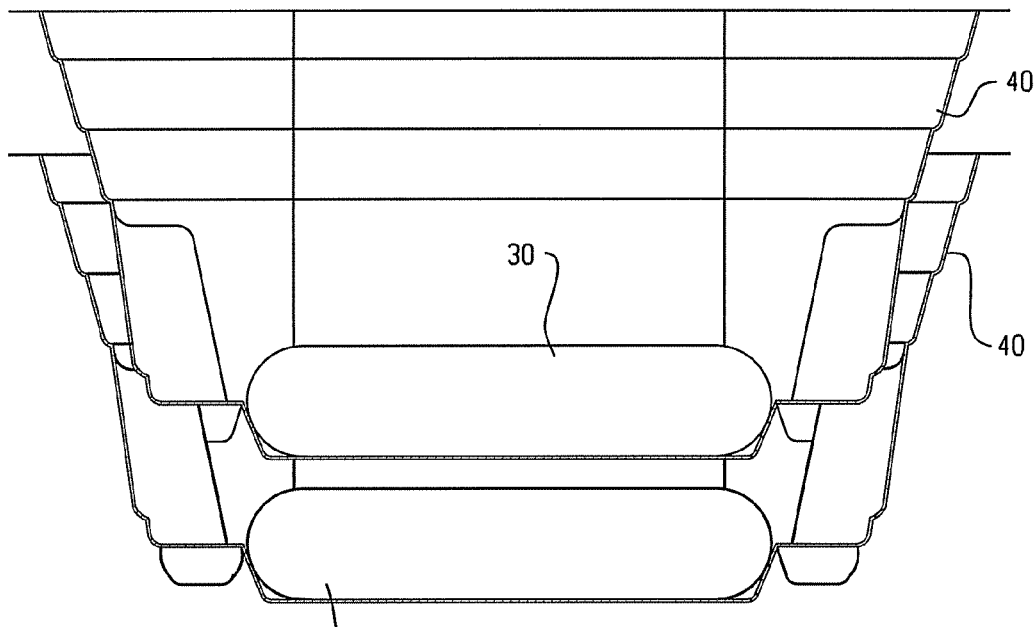
FIG. 8 is an illustration depicting a nesting of assembled brewing apparatus.

FIG. 7 depicts a cross-sectional view of a nesting of a plurality of the brewing baskets 40 for storage prior to the assembly process described here above. Note that the baskets 40 are configured in shape to fit closely within each other so that they take up little space during storage. FIG. 8 depicts a cross-sectional view of a nesting of a plurality of the assembled brewing apparatus which may be stacked closely within each other. Accordingly, a stack of a plurality of assembled brewing apparatus may be packaged together for retail sale without taking much space on the shelves of the retailer or consumer.

Figure 17:
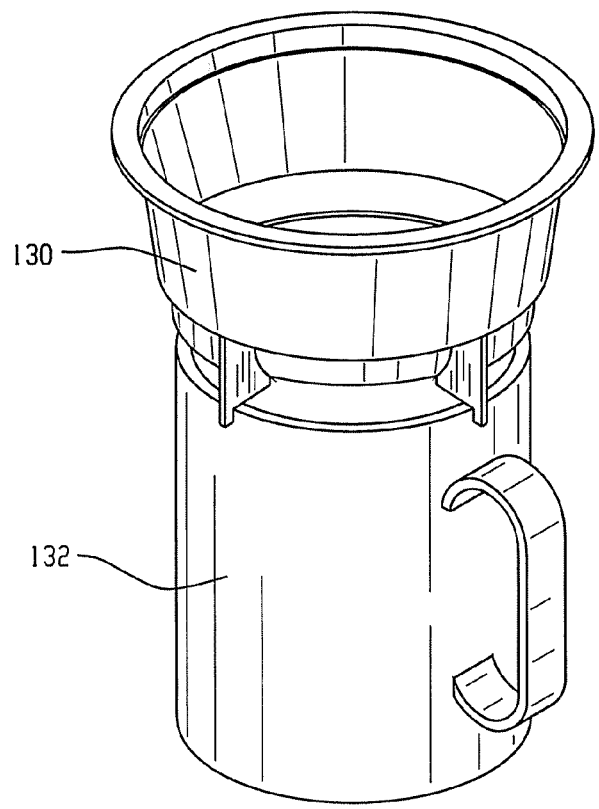
FIG. 17 is an isometric illustration of an assembled brewing apparatus seated on a drinking container.

Upon purchase of a retail package, the consumer may remove a brewing unit from the package and fill the container 40 to a suitable level with a desired liquid, like water, for example. If the brewer unit is to be used for single cup brewing of a liquid, the consumer may fill the container 40 with 8 or 9 ounces of the liquid, for example. A fill line may be provided for this purpose on one or more inside side surfaces of the container 40. Note that the weight of the liquid in the basket 40 will press the sub-assembly 30 firmly against the walls of the cavity 42 as shown in FIG. 6B. Then, the brewer unit may be placed on top of a drinking container which may be a mug, for example, so that the bottom surface of the cavity 42 rests on the circumference of the top edge of the mug as shown in FIG. 17. Note that the aperture 44 will fall within the top opening of the drinking container and the feet 46 will center the aperture 44 over the opening of the mug and keep the container 40 from sliding across the top edge of the mug.

Thereafter, the brewer unit and mug may be disposed within a microwave oven for heating which may take a few minutes depending upon the power of the oven. In the present embodiment, when the temperature of the liquid reaches the rupture temperature of the top film layer 18, which may be around 160° F., the film layer 18 will begin to weaken and rupture creating a pealing of the layer 18 starting at the rupture point(s) and moving toward the outside periphery exposing the filter paper layer 12. At this point the hot liquid will penetrate the paper layer 12 and mix with the brew substance. Note that the bottom film layer 20 has not yet ruptured, thus permitting the hot liquid to sit within and wet the particles of the brew substance 26 throughout the entire volume thereof providing for a more uniform infusion of the flavor of the brew substance into the brewing liquid.

The brewing liquid will continue to be heated by the microwave oven. Then, as the liquid reaches the rupture temperature of the bottom layer 20, which may be around 180° F., for example, the bottom layer 20 will rupture in a similar manner as the top layer 18, thereby dispensing the brewed liquid by gravity through filter paper 14 and aperture 44 into the drinking container. The brewing process may proceed for several minutes beyond the microwave cycle. Thereafter, the brewed liquid is within the drinking container. Note that the top and bottom filter paper layers 12 and 14 will keep the particles of the brew substance 26 within the containment volume of the packet 10 to ensure the full infusion of flavor during the brewing process. For a brewing of coffee, for example, the brewing cycle may take on the order of 3-5 minutes. For other brewing, the brewing time may vary depending on the liquid and brew substance used. Brewing time will also vary depending on the power of the microwave oven being used.

Some advantages of the foregoing described embodiment are as follows. Encapsulating the brew substance charge packet within the heat sensitive film layers provides preservation of the brew substance charge for each unit for some time after the retail package is ruptured. No user interaction is required to rupture or remove the film seal of the encapsulated packet as this occurs automatically in the brewing process. In addition, the phased exposure of the brew substance charge allows capillary action to first allow a small amount of liquid to gently permeate the brew substance before the higher flow rate brew process commences, thereby allowing a greater portion of the liquid in the reservoir to flow through a wetted brew substance charge.

Further, the present embodiment contains the brew substance in a stable shape within the filter packet, thereby keeping hydraulic drag uniform and predictable as is preferred for consistent extraction from one brewer to the next. Also, the brew substance charge is held in position where the fluid head pressure is great. Note that the brew substance is entirely contained within the filter paper packet which keeps the brew substance from entering the liquid reservoir.

FIG. 9 is a break away, isometric view of components of a sub-assembly unit 60, for containing the brew substance, suitable for use in an alternate embodiment of the brewing apparatus. Referring to FIG. 9, top and bottom heat sensitive film layers 62 and 64, respectively, encapsulate the brew substance 66 which in this embodiment may be coffee grounds, for example. The film layers 62 and 64 may be of the same or similar type and configuration as described herein above for the layers 18 and 20 and may be heat sealed together around the periphery of the rim portions thereof to fully encapsulate the brew substance. In addition, top and bottom filter paper layers 68 and 70, respectively, are disposed over and affixed to the surfaces of respective top and bottom film layers 62 and 64 to form the sub-assembly 60 which is shown by top and side views of FIGS. 10A and 10B, respectively. The filter paper layers 68 and 70 may be of the same or similar type and configuration as described herein above for the paper layers 12 and 14. FIG. 10C is a more detailed cross-sectional view of the layers 62, 64, 68 and 70 of the sub-assembly 60.

In the above manner, an encapsulated sub-assembly of the brew substance may be formed as a separate sub-assembly, then subsequently affixed to a liquid reservoir structure by ultrasonic, vibration, laser or heat welding, for example, as will be described in more detail in connection with FIGS. 11A-C. The described topology permits the use of relatively common sub-assembly forming machinery. By comparison, encapsulation of the coffee grounds in prior concepts would necessarily require a custom machine capable of handling the molded reservoir in addition to the paper and plastic layers in a nitrogen environment. With the instant sub-assembly, only its manufacture will take place in a nitrogen environment and not the assembly of the entire brewer unit. It is preferable to provide a 100% nitrogen environment near the assembly process as well as that trapped in the encapsulated package to displace potentially harmful oxygen.

Figure 11A:
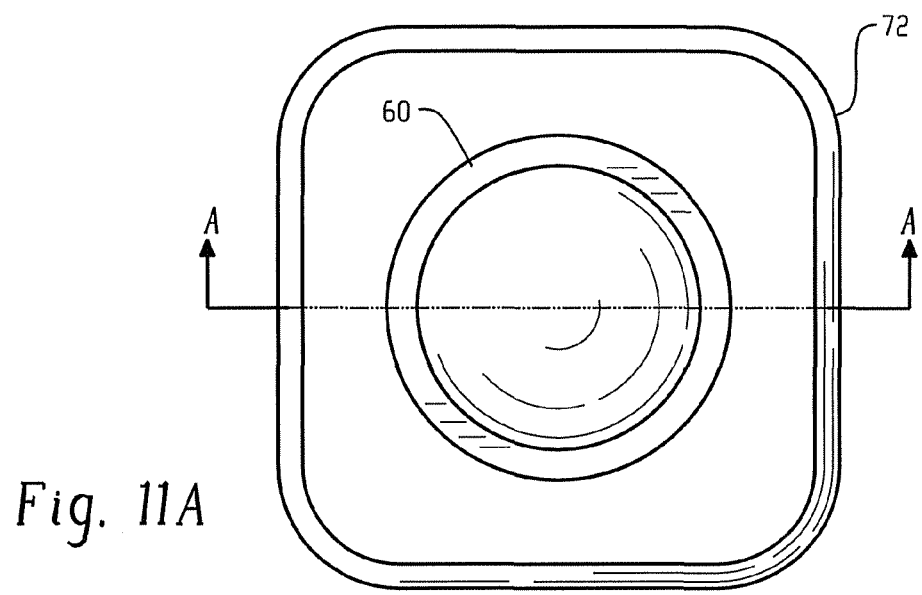
FIGS. 11A and 11B are top and cross-sectional side views of an assembled brewing apparatus in accordance with another aspect of the present invention.
Figure 11B:
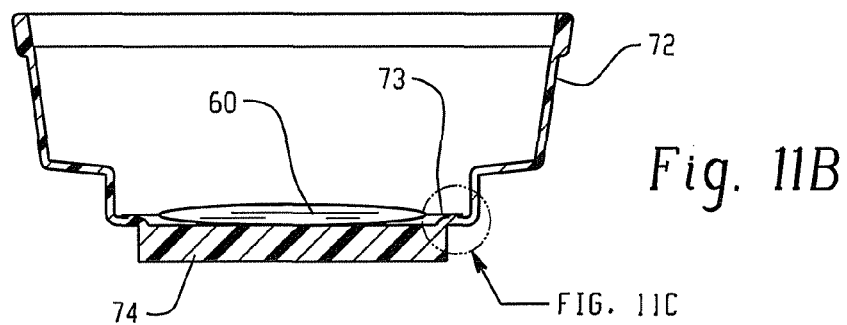
Figure 12A:
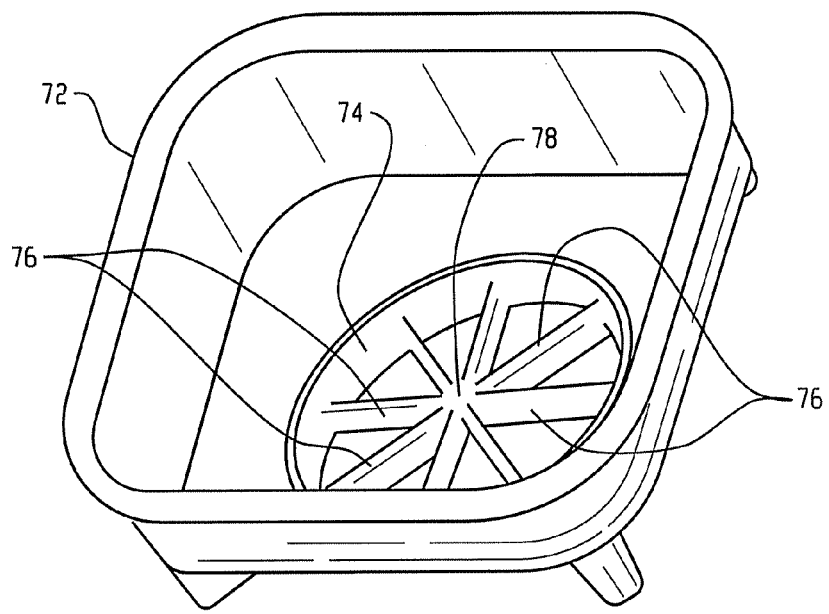
FIGS. 12A and 12B are top and bottom isometric views of a container suitable for use in the embodiment of FIGS. 11A and 11B.
Figure 12B:
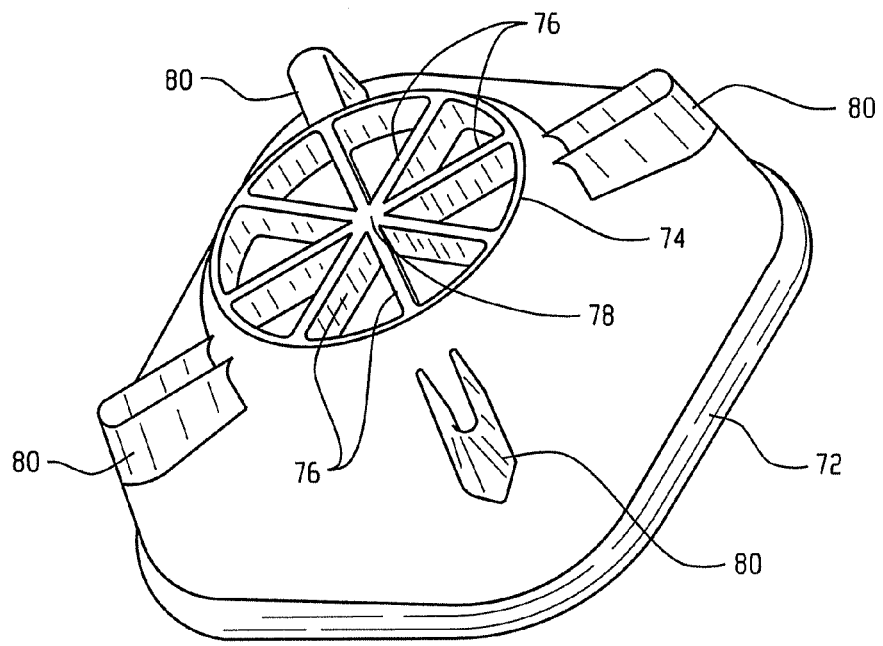

FIGS. 11A and 11B depict top and side views of a liquid reservoir basket 72 containing the brew substance sub-assembly 60 disposed over a bottom liquid diffuser section 74 that is shown in greater detail in the top and bottom isometric views of FIGS. 12A and 12B. In this alternate embodiment, the reservoir 72 is square or rectangular in cross-section and the bottom diffuser section 74 is cylindrical in shape and contains spokes 76 attached between the outer periphery of the section to a point 78 at a center of the section. The spokes 76 are disposed uniformly about the opening periphery to create wedge shaped openings therebetween through which liquid may be dispensed from the reservoir 72.

Figure 11C:
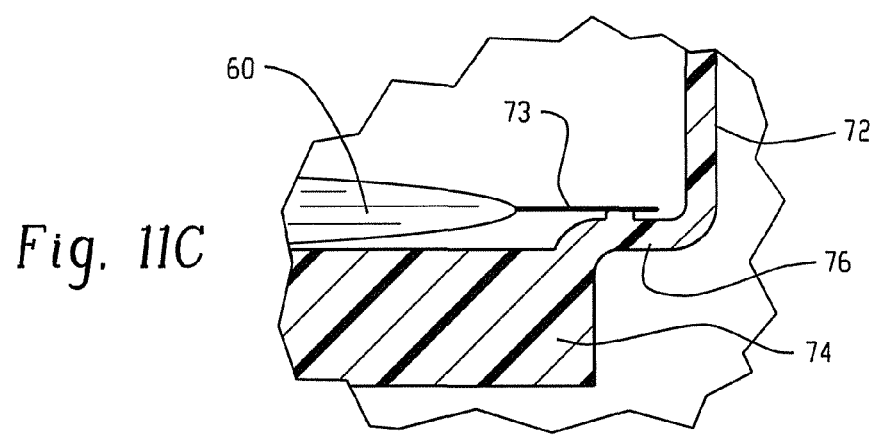
FIG. 11C is a cut-away, more detailed, cross-sectional view of a portion of the assembly depicted in FIGS. 11A and 11B.

FIG. 11C is an enlarged cross-sectional view illustrating how the rim 73 of the sub-assembly 60 rests circumferentially on a ledge 76 of the reservoir 72 disposed around the bottom surface thereof. As noted above, the rim 73 of the sub-assembly 60 may be affixed to the ledge 76 of the liquid reservoir structure 72 by ultrasonic, vibration, laser or heat welding, for example. Also, as shown in FIGS. 12A and 12B, feet 80 may be formed or attached about the bottom periphery of the reservoir 72, preferably aligned with the four corners of the rectangular cross-section thereof. The cylindrical diffuser section 74 may extend a distance below the feet 80 so that when the reservoir 72 rests on the top edges of a drinking container during the brewing process as described herein above, the cylindrical diffuser section 74 will fall within the opening of the drinking container. The passage way from reservoir 72 or open area of diffuser section 74 over which the brew substance sub-assembly 60 is disposed is large and less restrictive in the instant embodiment. The large opening will result in more uniform contact between water and coffee grounds, ultimately providing improved extraction and shorter brewing times.

A few points regarding the proposed sub-assembly construction are as follows: the filter paper layer on top prevents buoyant grounds from rising into water reservoir (i.e. keeps grounds in a brew chamber for optimal extraction); the filter paper layers on top and bottom facilitate the thermal fusing due to the fact that the paper prevents the melted plastic films from adhering to the heating die (It is believed that the same benefit might be observed in the ultrasonic welding process); as before, the top and bottom dual heat sensitive film construction provides a freshness seal, particularly one that requires no user intervention to breach; the difference in melting temperatures between top film layer upstream of the bottom film layer provides two functions: (a) assurance that the lower film will eventually rupture (not guaranteed if both films are the same melt point because water loses temperature as it passes through the grounds), and (b) lower film retains hot water momentarily in a brew chamber to assure good saturation of grounds.

As noted above, a suitable material for the reservoir 72 is styrofoam (a.k.a., EPS, expandable polystyrene) which may be EPS molded into the desired configuration or shape due to its superior thermal insulating properties. Use of this material will shorten microwave heating time of the brewing liquid when compared with more dense plastic materials. Also noted above, multiple brewer assemblies may be nested for efficient packaging. The use of a sealed multi-pack retail container (not shown) is intended to provided a freshness seal (in addition to the individual sealing of the coffee within each "brewer" provided by the two EVA film layers in each sub-assembly. The sealing of each individual sub-assembly permits the freshness seal of the multi-pack container to be opened and still preserve the freshness of the brew substance within the individual sub-assemblies.

Figure 13A:
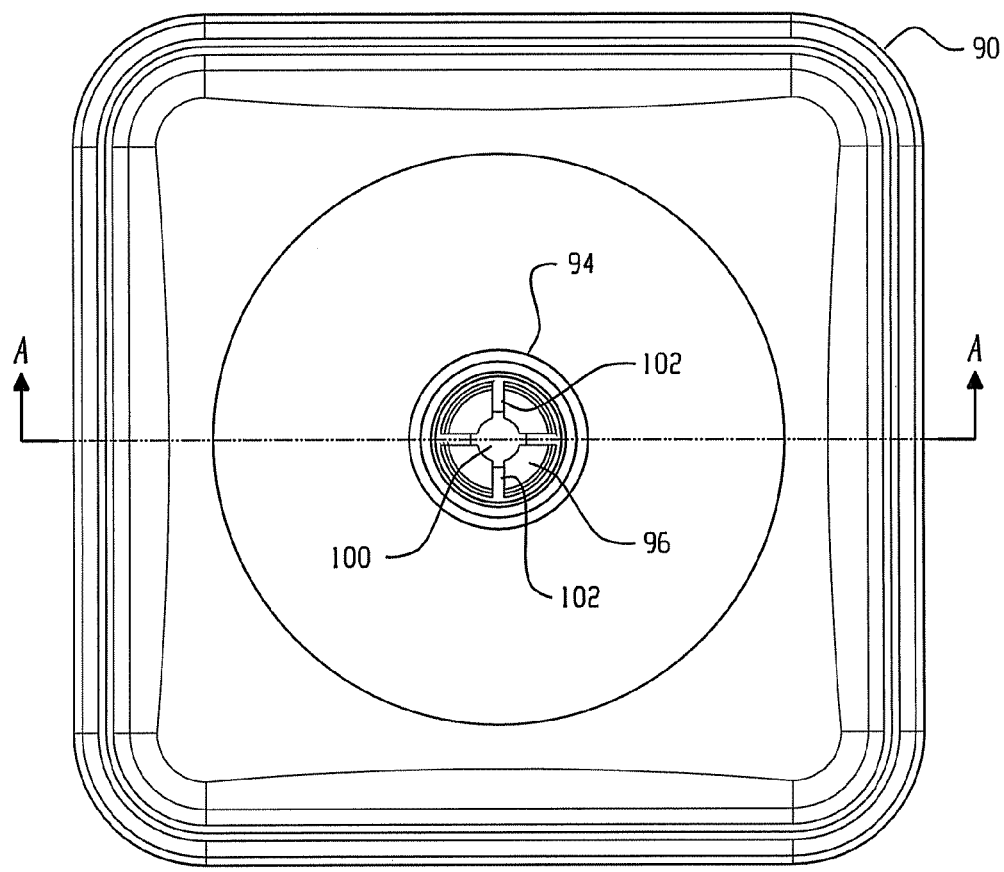
FIGS. 13A and 13B are top and cross-sectional side views of an assembled brewing apparatus in accordance with yet another aspect of the present invention.

An exemplary embodiment of brewing apparatus in accordance with another aspect of the present invention is depicted in FIGS. 13A-16. Referring to FIGS. 13A and 13B which depict top and cross-sectional views of this brewing apparatus, a liquid reservoir 90 is shown having a square cross-section which tapers in cross-sectional area from top to bottom. Attached to the bottom of the reservoir 90 is a brewing chamber 92 which is cylindrical in shape. The reservoir bottom is sloped toward a drain area 94 which forms a passageway between the reservoir 90 and the brewing chamber 92. The reservoir 90 is designed to hold the brewing liquid, which may be water, for example. Liquid is typically added to and then heated in the reservoir 90 within a microwave oven. Pre-heated liquid may be added to speed the microwave heating process. Very hot liquid may be used to avoid using the microwave oven completely.

As noted above, the reservoir 90 preferably has a square or rectangular cross-sectional shape but may be any shape. A square or rectangular shape maximizes the holding capacity of the reservoir for space used in a microwave oven. The shape of the inventive brewing apparatus is preferable because it allows the brewer to fit the apparatus in the small compartments within any known microwave ovens. For example, comparing round and square reservoirs having an equal diameter and side length respectively and equal heights, the square reservoir has a greater volume capacity. It follows that a square reservoir with the same volume capacity and side length as a round reservoir diameter may have a shorter height. This is beneficial if the microwave oven in use has a compact design. Although, the primary benefit of nesting is potentially permitting the placement of a greater number of units on the limited area of a retail shelf. Many different shapes of the reservoir may be nested with equal vertical efficiency. Nested circular shapes are preferred because they can be oriented in an infinite continuum, whereas a rectangular shape has only four nesting positions 90° apart.

Figure 13B:
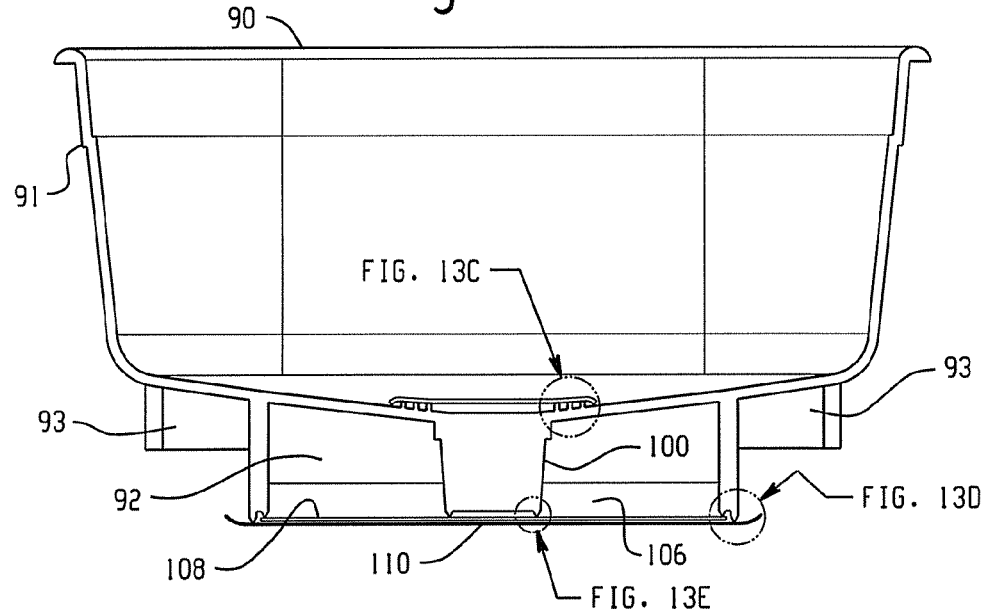

The reservoir 90 may be made from a transparent or translucent material. This allows for visible observation of liquid level within the reservoir. A preferred material is polypropylene. The polypropylene may have a melting temperature of about 210° F. The reservoir 90 may include a reinforcing seam 91 as shown in FIG. 13B. The seam 91 may serve multiple purposes. First, the seam 91 may add to the rigidity of the reservoir 90, preventing it from being crushed easily. Second, the seam 91 may be positioned to act as a fill line that permits a user to know when a desired volume of liquid has been poured into the reservoir 90.

The reservoir 90 may include a series of feet 93 upon its bottom surface. The feet 93 may have varying configurations. The feet 93 of the present embodiment may be similar to the feet 80 shown in FIG. 12B wherein each foot is formed by a pair of parallel protrusions. The protrusions bend towards each other at the periphery of the reservoir and are joined (i.e. rounded). At the opposite end, the protrusions abut a wall of the brewing chamber 92 (see FIG. 14). In an alternate embodiment each foot may be a single protrusion. The feet 93 function to provide strength and rigidity to the base of the reservoir and act as a support for the brewer upon a cup or mug. The extended length of each foot allows a single sized brewer to be stably placed upon drinking containers of varying diameters. Thus, the brewer is universal to several types and sizes of mugs and cups. In other embodiments, the feet 93 may not be necessary.

Figure 14:
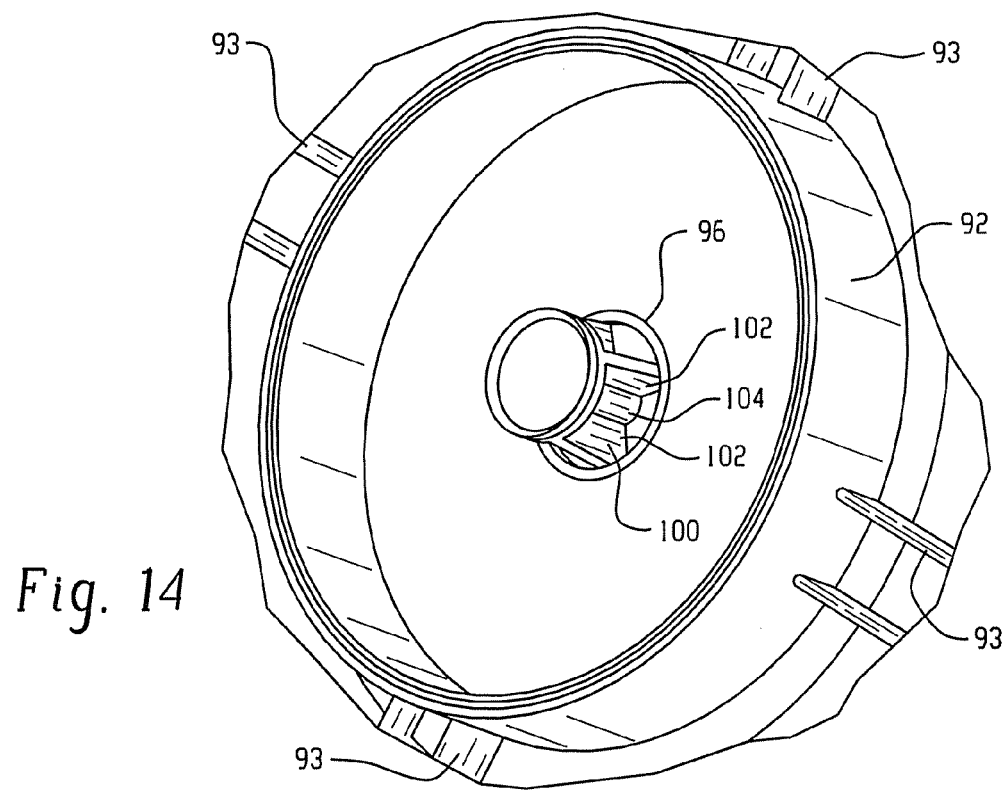
FIGS. 14 and 15 are bottom and top cut-away, isometric views of drain apparatus suitable for use in the embodiment of FIGS. 13A and 13B.

The drain assembly 94 functions as a liquid passageway between the reservoir 90 and the brewing chamber 92. Refer additionally to FIG. 14 which is a cut-away, isometric bottom view of the inside of the brewing chamber 92 and to FIG. 15 which is a cut-away, isometric top view of the base of the reservoir 90, both views showing the drain assembly 94 in greater detail. The drain assembly 94 may include an aperture 96 within the base of the reservoir 90. The aperture 96 may be covered with a heat sensitive film seal 98 described in more detail below. The drain assembly may also include a diffuser extension 100 which extends downward from the base of the reservoir 90 through the aperture 96. The diffuser extension 100 may be integrally formed with the reservoir 90.

Figure 15:
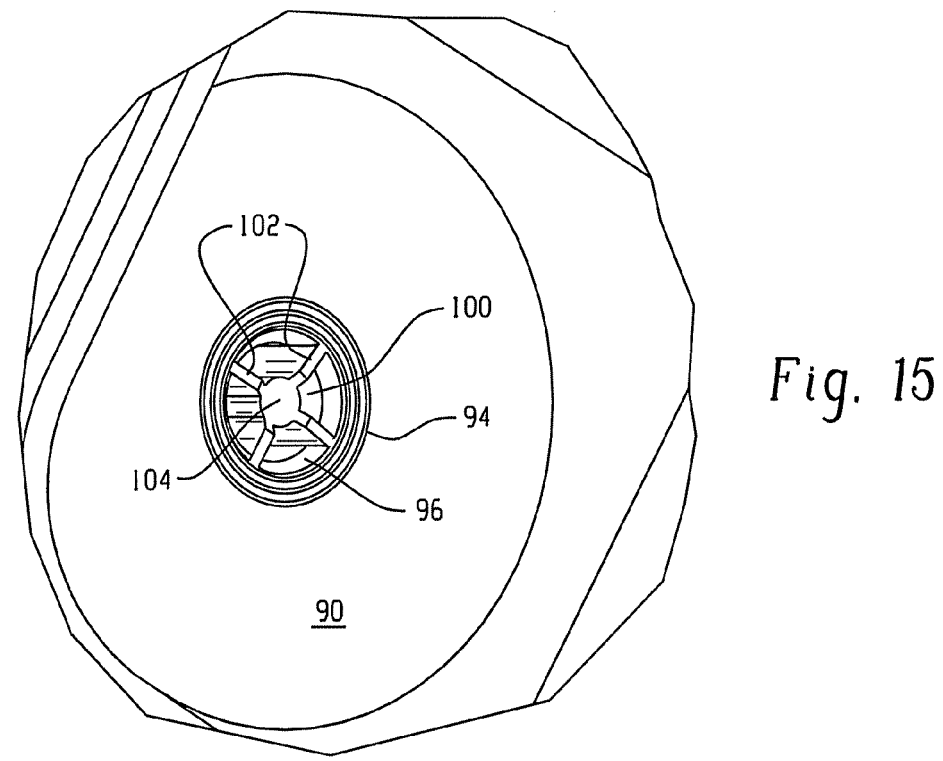

The diffuser extension 100 may include a number of spokes 102 extending from a center axial member 104, which is oriented downward transversely to the aperture 96, to the wall of the aperture 96 (see FIG. 15). The structure of the axial member 104 and spokes 102 extends below the aperture 96 (see FIG. 14) to form wedge shaped open areas to the brewing chamber 92. The axial member 104 and spokes 102 defining these wedge shaped open areas act as a structural support frame. The support properties of the diffuser extension 100 also prevent a filter paper layer, which is positioned below the drain assembly 94 from being deformed upwards during packaging or handling of the brewer as will become more evident from the description herein below. The open areas or apertures within the diffuser extension 100 in combination with the support frame allow liquid flowing through the drain assembly 94 to be spread radially through the brew chamber 92 as opposed to being concentrated in a position directly below the reservoir aperture 96. The presence of a diffuser structure is important to both the taste of the brewed liquid and the uniform time of brewing for all brew substance particles in the brewing chamber 92.

In the present embodiment, the brewing chamber 92 is defined by a circular wall extending down from the bottom of the reservoir 90. The brewing chamber 92 may have any shape however. The brewing chamber holds the brew substance 106 which may be coffee grinds, for example. The grind size of the coffee grounds may be varied to meet the desired brewing characteristics. The grind size may also vary depending upon the type of coffee caffeinated, or decaffeinated being used. Filter paper 108 supports the brew substance 106 within the brewing chamber 92. The brewing chamber 92 is open on its base but for the presence of the paper filter 108 and another heat sensitive film seal 110 as described below. In one embodiment, the height and diameter of the open base of the brew chamber are about 0.5 inches and 2.25 inches, respectively. In comparison, the aperture 96 in the bottom of the reservoir may have a diameter of about 0.5 inches in the same embodiment (a 4.5 to 1 ratio). This ratio may be adjusted to achieve the desired brew characteristics.

As noted above, the brewing chamber 92 holds a charge of brew substance 106, which may be coffee, through which hot brewing liquid, like water, will flow. The particle or grind size of the brew substance charge may be varied according to the brew substance being used. The grind size may also be modified to vary the residence time of the liquid within the brew chamber 92 as well as to vary the flow characteristics of the liquid across the charge of grounds. In addition to the use of different types or flavors of brew substance, substance complements or substitutes may be used. Sweetener or powdered dairy products may be mixed with the grounds. Alternatively, the sweetener or powdered dairy products may be place as separate stratified layers within the brew chamber 92. The stratified layers may be placed in any order. The stratified layers by be separated by filter paper layer 108, heat sensitive film seal layer 110 or by no material at all. The charge 106 of the particles of brew substance and perhaps complements may be pressed into a puck shaped form using conventional press machinery.

The paper filter layer 108 is disposed below the brew substance charge 106 to prevent grounds from entering the cup or mug of the brewer. The filter 108 may have varied characteristics such as fiber type, size, denier, length and configuration. These characteristics may be varied to achieve desired brew scenarios. For example, the residence time within the brewing chamber may be controlled. Additionally, the degree the water spreads radially within the brewing chamber may be controlled.

Figure 13C:
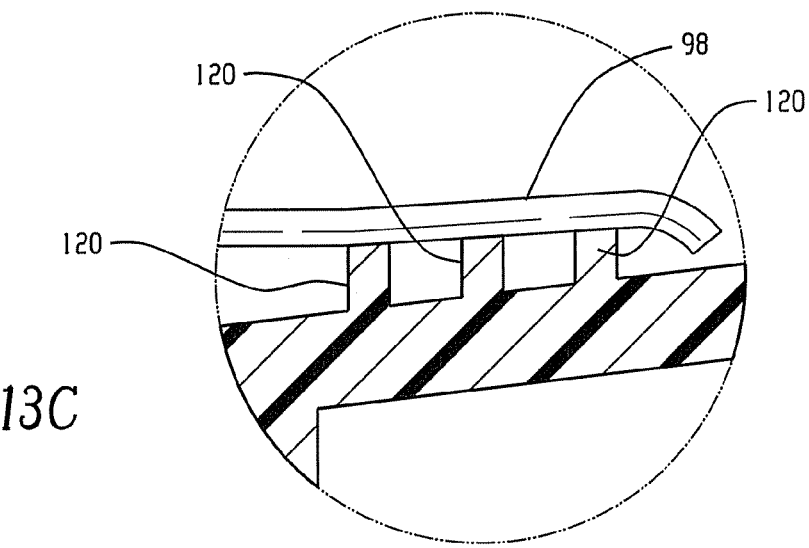
FIGS. 13C-13E are cut-away, cross-sectional views of certain details of the assembly depicted in FIGS. 13A and 13B.
Figure 13D:
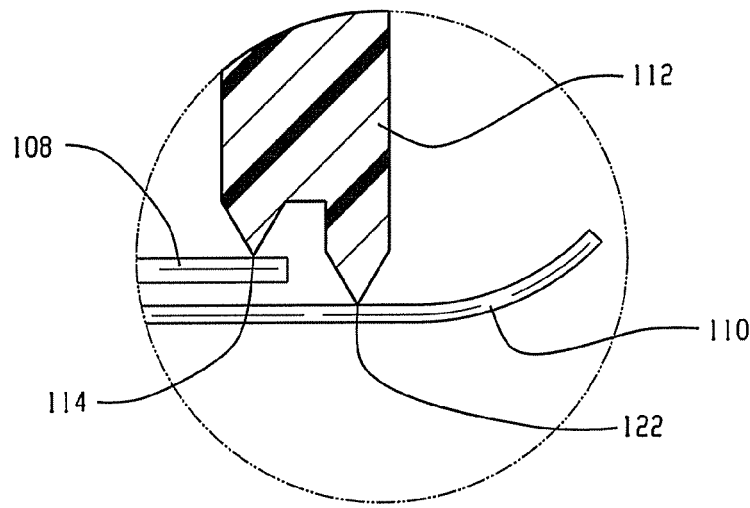
Figure 13E:
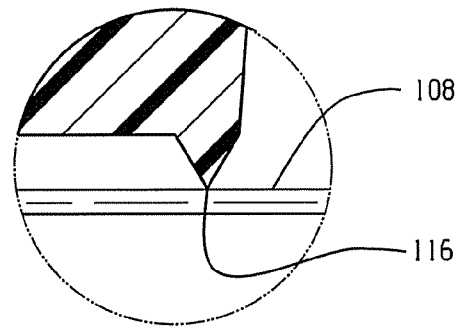

The paper filter layer 108 may be adhered to the walls 112 of the brewing chamber 92 using a ultrasonic joining process as shown in the more detailed cross-sectional sketch of FIG. 13D. The brewing chamber walls 112 are formed to define a point 114 at their lowermost extremity. The paper filter layer is brought into contact with the brewing chamber at these points 114 and manipulated to form a connection as shown in FIG. 13D. This joining process may be repeated at the lowermost wall of the diffuser extension as shown in the more detailed cross-sectional sketch of FIG. 13E. As shown in FIG.

13E, the diffuser extension 100 defines a circular joining surface 116 at its base. Other methods of joining the filter 108 to the brewer apparatus may also be used such as adhesives or heat deformation of one or both of the joining materials.

In an alternate embodiment, the brew substance charge 106 may be contained in a sub-assembly pouch comprising a filter material as described herein above. Alternatively, the pouch may also be comprised of a film seal material also described above.

In the present embodiment, a heat sensitive film seal may be disposed over, thus blocking, the aperture 96 at the bottom of the reservoir 90 (see layer 98 in FIG. 13C) or, in a position beneath the filter paper layer 108 (see layer 110 in FIG. 13D), or in both positions. The heat sensitive film seal may provide one or more functions. First, the film may act as a heat sensitive valve device. At room temperature, the seal acts as a physical barrier between two areas. As liquid is heated in an area on one side of the film, a failure scenario begins. A set amount of time elapses before the heat of the hot liquid causes the film to rupture or fail. This amount of time may be a function of several factors:

1) The time required for the microwave oven to bring the liquid temperature to a temperature which begins to break down or rupture the film. In one embodiment, this "critical temperature" may be from about 195° F. to 205° F.; and
2) The films durability at the critical temperature which can be a function of the material of selection of the film, the thickness of the film, and the overall size of the film. A preferred film material is Ethylene Vinyl Acetate or Lomel. This material may have a melting or rupture point of about 160° F. A preferred film thickness is from about 0.0015 inches to 0.0030 inches. The film may be provided in colors or in a transparent form.

Preferably, the heat sensitive film layer 98 fails in a manner wherein the opening or aperture 96 formerly covered by the seal 98 is almost completely opened. In combination with this large degree of shrinkage in the film 98, the film still will not break into pieces, thus no bits of seal material will be received in the consumer's cup or mug.

One benefit of using the heat sensitive film layer 110 below the filter paper layer 108 is to increase the residence time of the hot liquid within the coffee grounds. When the two film seals 98 and 110 are used, they may be designed to have identical or varied failure properties. In one method of brewing, the upper seal film 98 is designed to fail at 180°-190° F. and the lower seal at 160°-170° F., but these temperature properties may be reversed. The failure temperature can be controlled by the film material used and the thickness of the material.

The dual film layers 98 and 110 may provide a second function of sealing the coffee grounds from the atmosphere. Humidity, smells or contaminants may be present in the surrounding air and should be isolated from the coffee grounds. The dual film layers may be gas permeable but may also be designed to provide the necessary air tight seal. The dual film layers increase the shelf-life of the brewer for storage purposes in a user's home. It locks in freshness.

In the embodiment utilizing the film seal 98 to cover the reservoir aperture 96 and the film seal 110 disposed below the filter paper layer 108, an alternative film material such as foil may be used in one of the positions if heat sensitive properties are not necessary. The film seals 98 and 110 may be held in place with an adhesive using an ultrasonic joining process similar to that described above with respect to the filter 108, by a fastener such as an o-ring, or by melting the film to the brewer. FIG. 13C shows the film layer 98 joined to the brewer bottom at annular protrusions or raised ribs 120 encircling the drain area 94 in close proximity to the aperture 96. The one or more ribs 120 raised from the reservoir floor provide binding surfaces for the film seal 98. Beneath the filter paper layer 108, the film seal 110 bonds to a point 122 on the wall 112 of the brewing chamber (see FIG. 13D) which extends below and to the outside of the point where the filter is bound.

Figure 16:
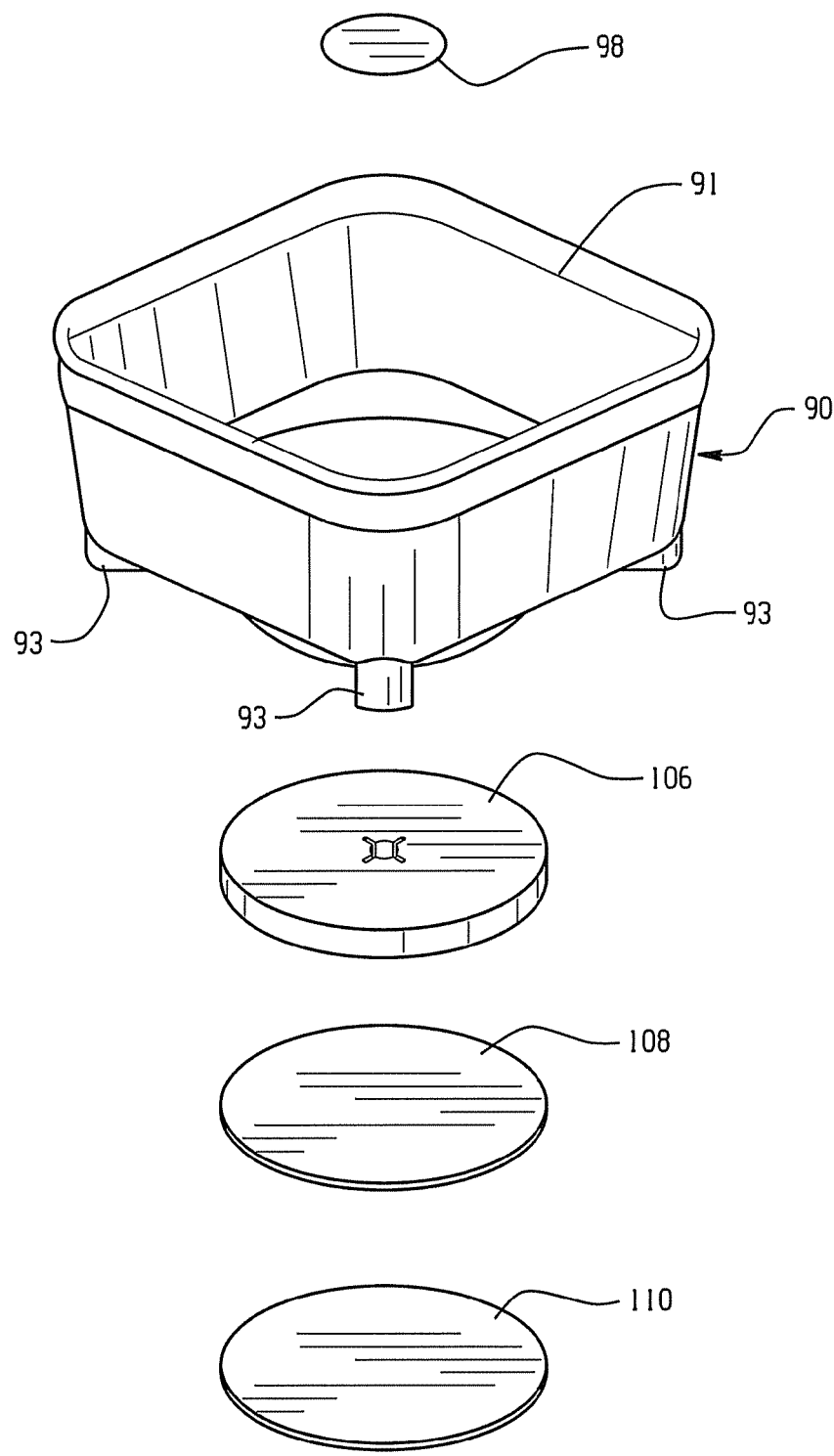
FIG. 16 is a break away, isometric view of components of the embodiment of FIGS. 13A and 13B.

Referring to the break-away, isometric view of the brewing apparatus of the present embodiment shown in FIG. 16, a preferred method of manufacturing the brewing apparatus includes sealing the aperture 96 in the bottom of the reservoir 90 with the heat sensitive film while the reservoir 90 is in an upright position; and then, rotating the reservoir 90 180 degrees so that the bottom is upright. In this rotated position, the charge 106 of brew substance is disposed in place within the brew chamber 92; the paper filter layer 108 is then disposed in place and attached to the points 114 and 116 as described herein above; and then, the second film seal layer 110 is disposed over the opposite side of the filter from the brew substance charge 106 and attached to point 122 of the wall 112 of the brewing chamber 92.

FIG. 17 is an illustration of a brewing apparatus 130 having a cylindrically shaped reservoir engaged on a cup 132 for brewing in a microwave oven. The liquid fill capacity of the reservoir 130 for single cup brewing is between 8 to 9 ounces (8 oz. fill is intended to yield 7 to 7½ ounces of drinkable coffee, whereas a 9 ounce fill yields approximately 8 oz of drinkable coffee). As noted above, the square cross-sectional shaped reservoir is believed to allow better utilization of available product shelf space, allowing both the retailer and user to increase nesting efficiency.

Figure 18:
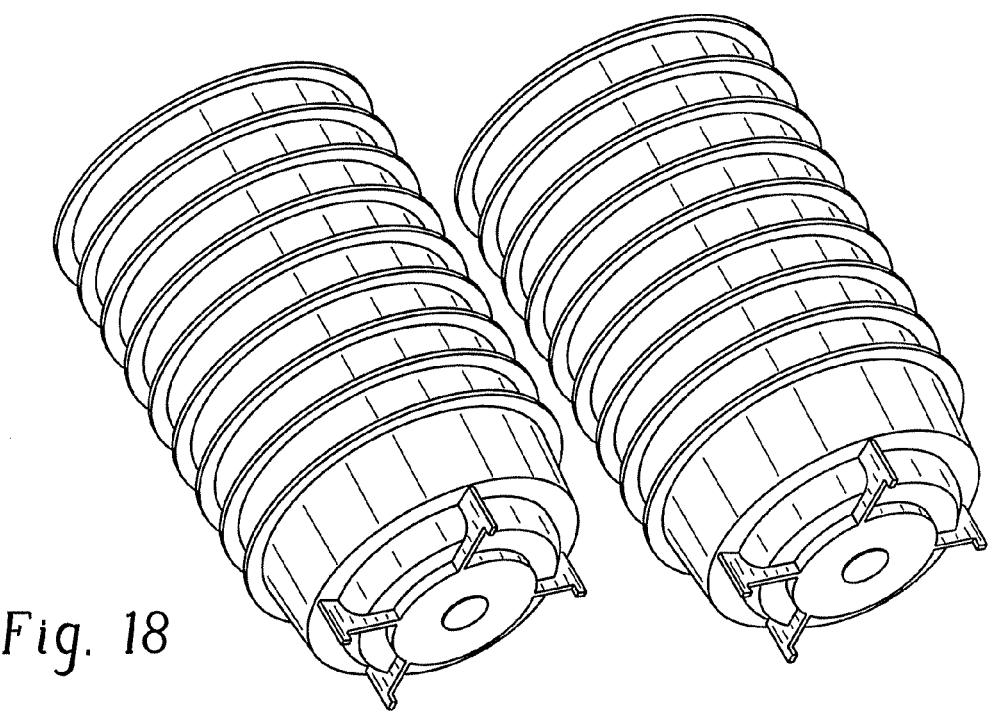
FIG. 18 is an illustration of a nesting of exemplary assembled brewing apparatus.

FIG. 18 illustrates the proposed retail packaging of the brewers in an exemplary nested or stacked configuration. The nested brewers may then be stored in a metal or paper tin for sale. The outer tin cover may provide an additional seal to protect from spoilage.

Figure 19:
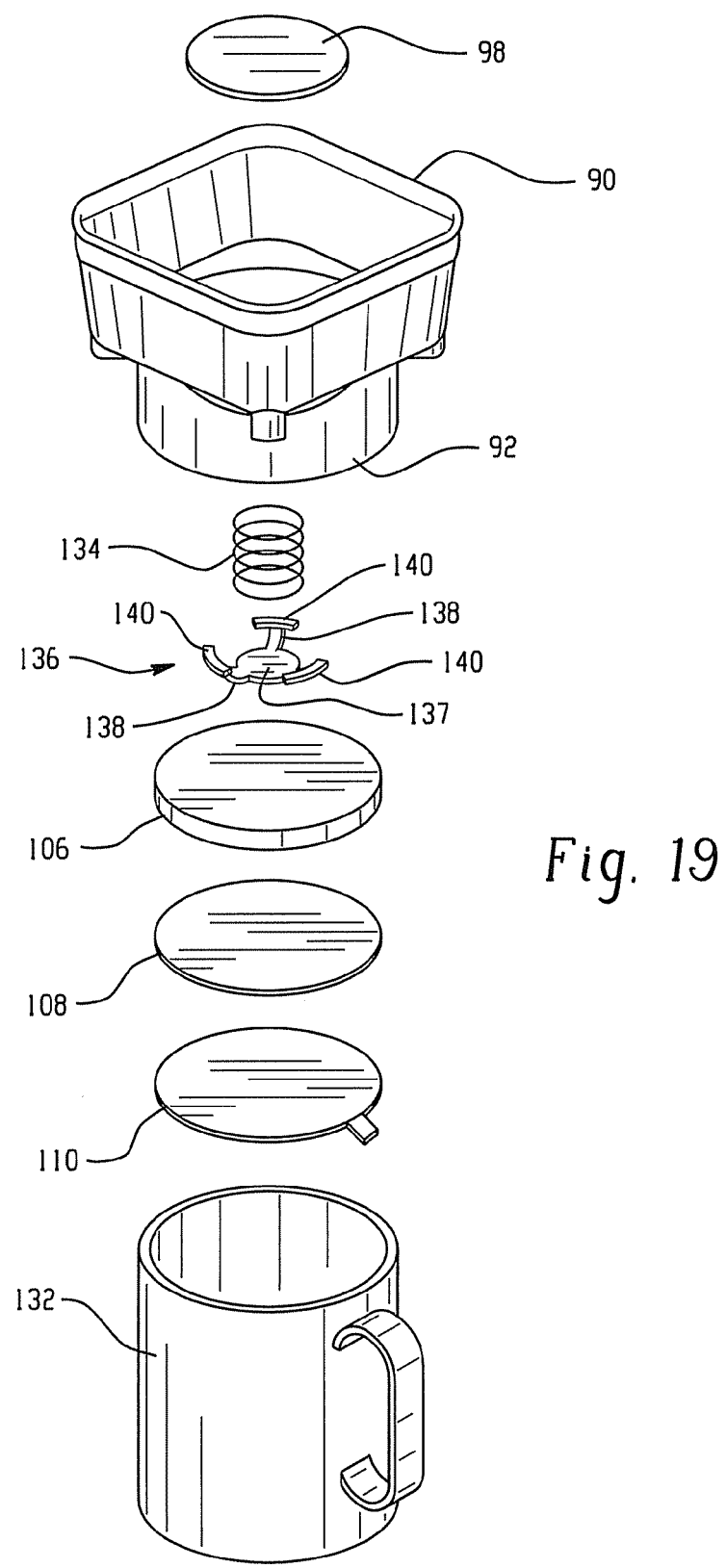
FIG. 19 is a break away, isometric illustration of components of a brewing apparatus suitable for embodying yet another aspect of the present invention.
Figure 20:
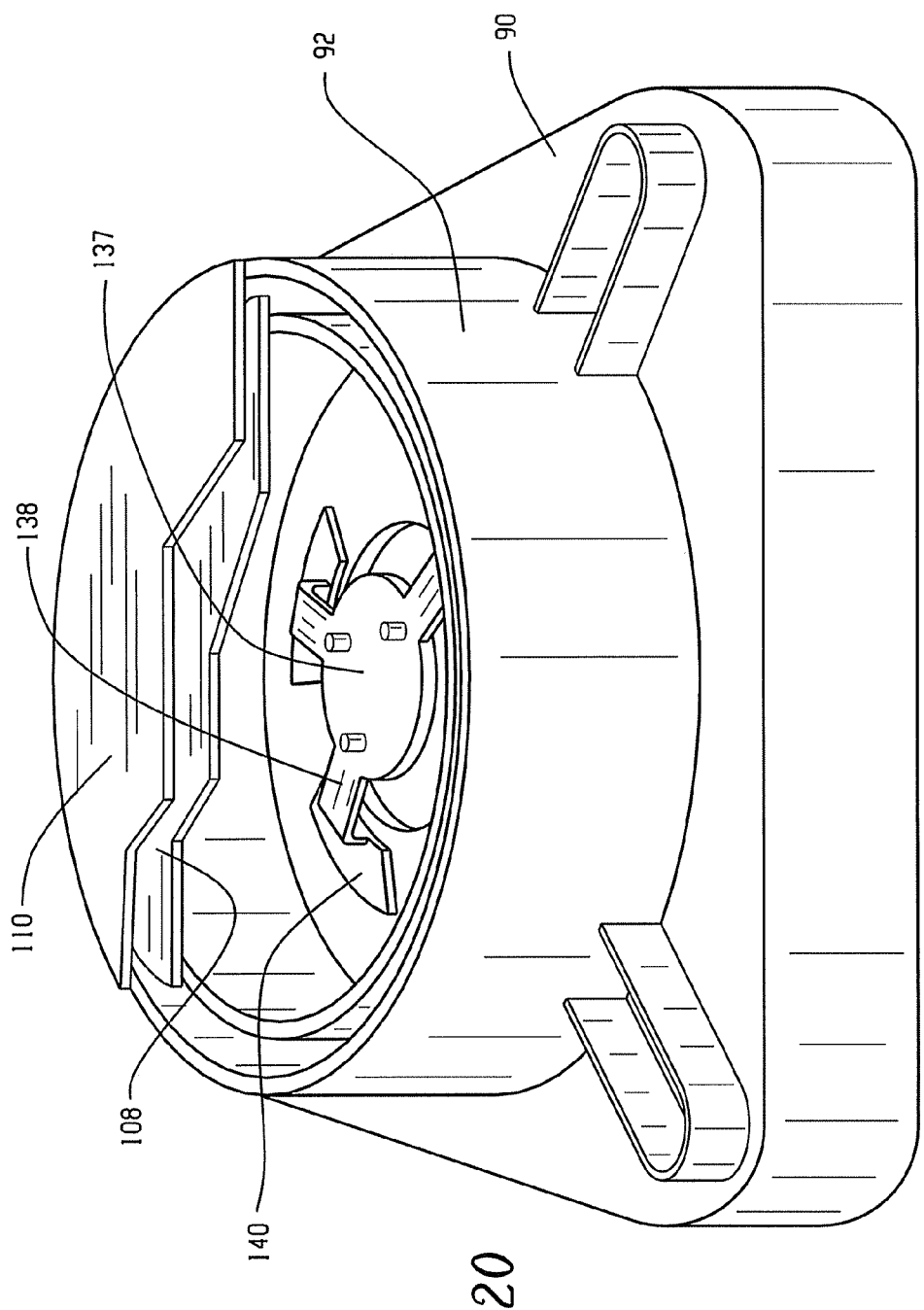
FIG. 20 is an isometric, cut-away bottom view of the brewing apparatus depicted in FIG. 19.

FIGS. 19 and 20 depict exemplary brewing apparatus suitable for embodying yet another aspect of the present invention. FIG. 19 is a break-away, isometric view of the components of the present embodiment. Many of the components of the embodiment of FIG. 19 are the same in structure and function as described above for the embodiment of FIGS. 13A-16. These same components will not be further described and the reference numbering will be maintained the same for the present embodiment. Referring to FIG. 19, a spring loaded valve assembly comprising a spring 134 and valve 136 are disposed in the brewing chamber 92 at the aperture 96. One end of the spring 134 is attached to the valve 136 and the other end is attached to the circumference of the aperture 96. The valve 136 includes a flat, circular center surface 137 and three resilient legs 138 attached around the periphery of the surface area 137 at points that are approximately 120° apart. The ends of the legs 138 comprise elongated surface areas 140 transverse the legs 138. The surface areas 140 of legs 138 are attached to respective areas of the bottom of the reservoir 90 within the brewing chamber 92 as shown in the cut-away, isometric view of FIG. 20.

Prior to brewing, the spring 134 is maintained in a compressed state to permit the flat surface 137 of the valve 136 to cover and seal the aperture 96 of the reservoir 90. In the present embodiment, the spring 134 is maintained in the compressed state by a temperature sensitive wax material which may be also used to attached the spring 134 to the valve surface 137. The wax material used for the present embodiment includes an amide wax, such as ethylene bis-stearamide, as well as a long chain ketone, like stearone, for example. But, it is understood that other ingredients may be used for the wax just as well.

During the brewing process, as the temperature of the reservoir liquid increases, the wax material is eventually melted, allowing the spring 134 to extend to its uncompressed state. A suitable melting temperature of the wax material may be approximately 160 to 190 degrees F. This extension of the spring 134 forces the surface area 137 away from the aperture 96, thus creating an opening or passageway for the heated liquid to enter the brewing chamber 92 from the reservoir 90 and mix with the brew substance 160. The legs 138 act as guide bosses to prevent the valve surface 137 from floating back up into a sealed position after the wax releases. Eventually, the bottom film seal layer 110 will rupture permitting the hot brewed liquid to be dispensed through the paper filter layer 108 and into the mug 132. In this embodiment, the upper film seal layer 98 may be dispensed with because the valve assembly itself is temperature sensitive and functions in a similar manner.

Figure 21:
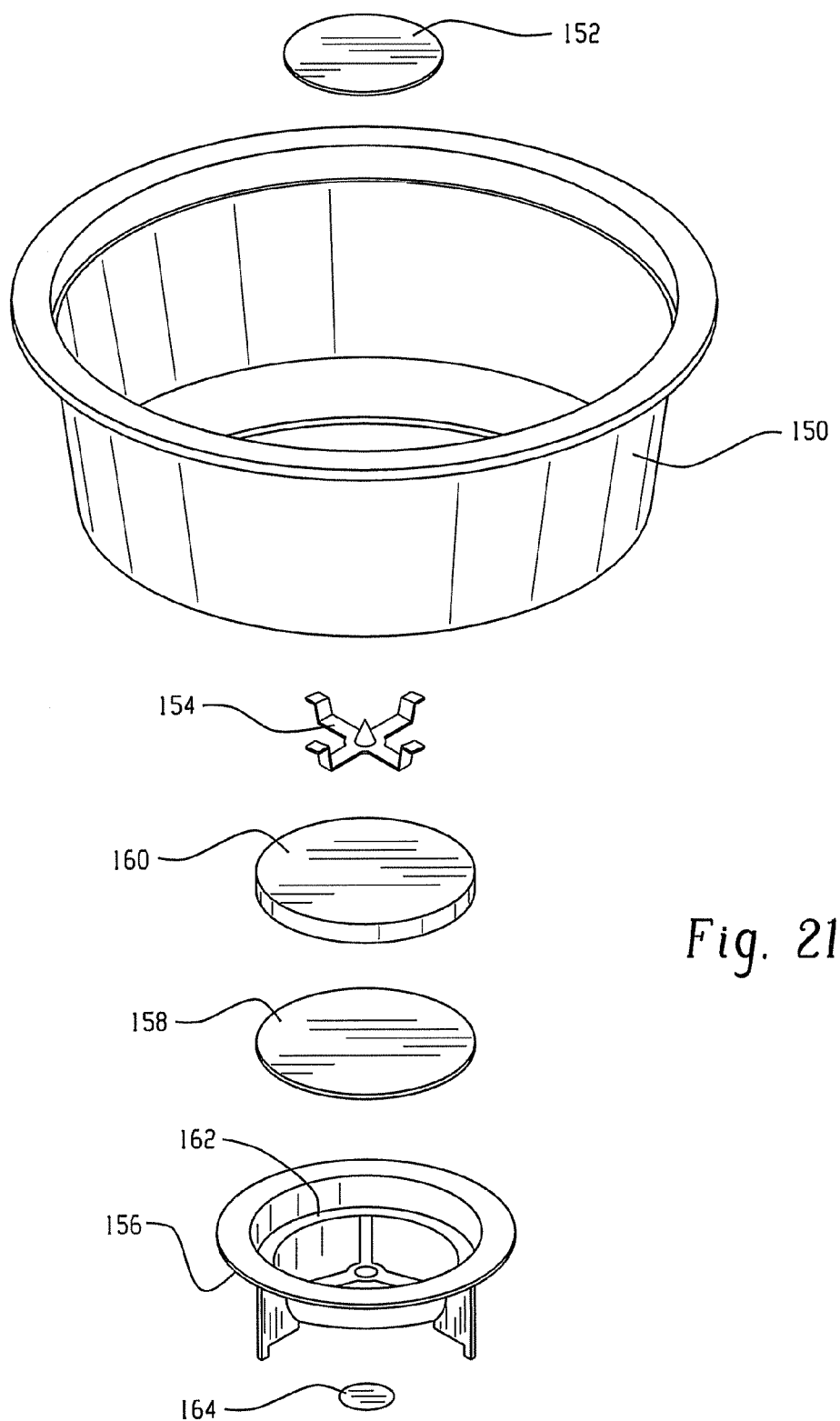
FIG. 21 is a break away, isometric illustration of components of a brewing apparatus suitable for embodying yet another aspect of the present invention.

A break-away, isometric view of components of a brewing apparatus suitable for embodying yet another aspect of the present invention is shown in FIG. 21. Referring to FIG. 21, the present embodiment comprises a cylindrically shaped liquid reservoir 150, which may be made of polypropylene, for example, having a small liquid dispensing aperture (not shown) in the bottom thereof. A top heat sensitive film seal 152, which may be a foil-laminate, for example, may be used to cover and seal the dispensing aperture in the reservoir 150. A valve assembly 154 similar to the valve assembly described here above may be attached to the outside bottom of the reservoir 150 to cover and seal the dispensing aperture. The valve 154 may be made of a polycarbonate material, for example, and operate in a similar manner to the valve 136.

In addition, a brew funnel 156 which may be also made of polypropylene, for example, is attachable to the base of the reservoir 150. The brew funnel 156 includes a brew chamber therein for supporting a filter paper layer 158 and a charge of brew substance 160. The bottom of the brew funnel 156 includes at least one aperture for dispensing brewed liquid therefrom. The filter paper layer 158 may be disposed on and, possibly bonded to, a ring ledge 162 formed along the inner periphery of the brew funnel 156 and the charge 160 may be disposed over the filter paper 158. A bottom heat sensitive film seal layer 164 may be attached to the bottom of the funnel 156 to cover and seal the at least one aperture thereof. The embodiment of FIG. 21 may operate in a similar manner to that described for the embodiment of FIGS. 19 and 20.

While the present invention has been described herein above in connection with a plurality of embodiments, it is understood that such presentation was provided strictly by way of example without any intent of limiting the invention in any way. Accordingly, the present invention should not be limited by the embodiment descriptions presented herein above, but rather construed in breadth and broad scope in accordance with the recitation of the appended claims hereto.

What is claimed is:

1. Apparatus for brewing a brew substance with a liquid, said apparatus comprising:
    a container for storing the liquid, said container including at least one aperture for dispensing liquid therefrom;
    an encapsulated packet of heat sensitive film containing the brew substance;
    a layer of filter paper covering said encapsulated packet to form a subassembly, said subassembly disposed within said container at a position covering said at least one aperture, said container configured to sit on top of a drinking container to permit liquid to drain into said drinking container from said at least one aperture thereof;
    a first layer of heat sensitive film forming a top surface;
    a second layer of heat sensitive film forming a bottom surface;
    wherein the first and second layers of heat sensitive film have different rupture temperatures.

2. The apparatus of claim 1 wherein the first layer of heat sensitive film forms the entire top surface and the second layer of heat sensitive film forms the entire bottom surface.

3. The apparatus of claim 1 wherein the brew substance comprises coffee grinds and the liquid comprises water.

4. The apparatus of claim 1 wherein the container is configured to store a single serving quantity of liquid; and wherein the encapsulated packet contains a single serving charge of brew substance.

5. Apparatus for brewing a brew substance with a liquid, said apparatus comprising:
    a container for storing the liquid, said container including at least one aperture for dispensing liquid therefrom;
    an encapsulated packet of heat sensitive film containing the brew substance;
    a layer of filter paper covering said encapsulated packet to form a subassembly, said subassembly disposed within said container at a position covering said at least one aperture, said container configured to sit on top of a drinking container to permit liquid to drain into said drinking container from said at least one aperture thereof;
    a first layer of heat sensitive film forming a top surface;
    a second layer of heat sensitive film forming a bottom surface, said first and second layers being attached together along the outer periphery thereof to encapsulate the brew substance;
    wherein the first and second layers of heat sensitive film have different rupture temperatures.

6. The apparatus of claim 5 wherein the subassembly is secured within the container.

7. The apparatus of claim 5 wherein the brew substance comprises coffee grinds and the liquid comprises water.

8. The apparatus of claim 5 wherein the container is configured to store a single serving quantity of liquid; and wherein the encapsulated packet contains a single serving charge of brew substance.

9. The apparatus of claim 5 wherein the container and layer of heat sensitive film are made of material suitable for microwave heating.

10. Apparatus for brewing a brew substance with a liquid, said apparatus comprising:
    a container for storing the liquid, said container including at least one aperture for dispensing liquid therefrom;
    a sealed packet of filter paper containing the brew substance; and
    a layer of heat sensitive film encapsulating said sealed packet, said encapsulated packet disposed within said container at a position covering said at least one aperture, said container configured to sit on top of a drinking container to permit liquid to drain into said drinking container from said at least one aperture thereof;
    wherein the sealed packet includes a top and bottom surface; and wherein the encapsulated packet includes:
        a first layer of heat sensitive film covering said top surface of the sealed packet;
    and
        a second layer of heat sensitive film covering said bottom surface of the sealed packet, said first and second layers being attached together along the outer periphery thereof to encapsulate said sealed packet within said first and second layers;

wherein the first and second layers of heat sensitive film have different rupture temperatures.

11. The apparatus of claim 10 wherein the encapsulated packet is secured within the container.

12. The apparatus of claim 10 wherein the container includes a cavity configured to accept the encapsulated packet; and wherein the encapsulated packet is disposed at said cavity.

13. The apparatus of claim 12 wherein the cavity is at a bottom of the container; and wherein the cavity includes a single aperture that covers a substantial area of the cavity.

14. The apparatus of claim 12 wherein the encapsulated packet includes a substantially flat rim about the periphery thereof; wherein the container includes a ledge configured about the periphery of the cavity; and wherein the rim of the encapsulated packet is seated on said ledge.

15. The apparatus of claim 14 wherein the rim of the encapsulated packet is secured to the ledge.

16. The apparatus of claim 10 wherein the first layer of heat sensitive film has a rupture temperature lower than the rupture temperature of said second layer of heat sensitive film.

17. The apparatus of claim 10 wherein the first layer of heat sensitive film has a rupture temperature of approximately one hundred and sixty degrees Fahrenheit and the second layer of heat sensitive film has a rupture temperature of approximately one hundred and eighty degrees Fahrenheit.

18. The apparatus of claim 10 wherein the container is configured with a plurality of feet to prevent the container from slipping off the drinking container when seated on top thereof.

19. The apparatus of claim 10 wherein the container is configured to permit a nesting of a plurality of containers by disposing one within the other.

20. The apparatus of claim 10 wherein the container is configured to have a rectangular cross-section tapered from top to bottom.

21. The apparatus of claim 10 wherein the brew substance comprises coffee grinds and the liquid comprises water.

22. The apparatus of claim 10 wherein the container is configured to store a single serving quantity of liquid; and wherein the sealed packet contains a single serving charge of brew substance.

23. The apparatus of claim 10 wherein the container and layer of heat sensitive film are made of material suitable for microwave heating.

24. Apparatus for brewing a brew substance with a liquid, said apparatus comprising:
 a container for storing the liquid, said container including at least one aperture for dispensing liquid therefrom;
 a sealed packet of filter paper containing the brew substance; and
 a layer of heat sensitive film encapsulating said sealed packet, said encapsulated packet disposed within said container at a position covering said at least one aperture, said container configured to sit on top of a drinking container to permit liquid to drain into said drinking container from said at least one aperture thereof;
 wherein the sealed packet includes a top and bottom surface; and wherein the encapsulated packet includes:
  a first layer of heat sensitive film covering said top surface of the sealed packet;
  and
  a second layer of heat sensitive film covering said bottom surface of the sealed packet;
  wherein the first and second layers of heat sensitive film have different rupture temperatures.

25. The apparatus of claim 24 wherein the first layer of heat sensitive film covers the entire top surface of the sealed packet and the second layer of heat sensitive film covers the entire bottom surface of the sealed packet.

26. The apparatus of claim 24 wherein the first layer of heat sensitive film has a rupture temperature lower than the rupture temperature of said second layer of heat sensitive film.

27. The apparatus of claim 24 wherein the first layer of heat sensitive film has a rupture temperature of approximately one hundred and sixty degrees Fahrenheit and the second layer of heat sensitive film has a rupture temperature of approximately one hundred and eighty degrees Fahrenheit.

28. The apparatus of claim 24 wherein the brew substance comprises coffee grinds and the liquid comprises water.

29. The apparatus of claim 24 wherein the container is configured to store a single serving quantity of liquid; and wherein the sealed packet contains a single serving charge of brew substance.

30. Method of making a brewing apparatus, said method comprising the steps of:
 configuring a container to store liquid for brewing and to dispense said liquid through at least one aperture therein;
 encapsulating a brew substance with a layer of heat sensitive film, wherein said encapsulating comprises:
  disposing the brew substance on a first layer of heat sensitive film;
  applying a second layer of heat sensitive film over the brew substance to form a top surface of the encapsulated packet; and
  wherein the first and second layers of heat sensitive film encapsulating the brew substance have different rupture temperatures;
 covering the encapsulated brew substance with filter paper to form a subassembly;
 disposing said subassembly within the container at a position covering said at least one aperture; and
 configuring said container to sit on top of a drinking container to permit liquid to drain into said drinking container from said at least one aperture thereof.

31. The method of claim 30 further wherein the second layer forms the entire top surface of the encapsulated packet.

32. The method of claim 30 wherein the step of covering includes:
 disposing first and second sheets of filter paper about the encapsulated packet; and
 sealing together the first and second sheets at the outer periphery thereof to form the subassembly.

33. Method of making a brewing apparatus, said method comprising the steps of:
 configuring a container to store liquid for brewing and to dispense said liquid through at least one aperture therein;
 encapsulating a brew substance with a layer of heat sensitive film, wherein said encapsulating comprises:
  disposing the brew substance on a first layer of heat sensitive film;
  applying a second layer of heat sensitive film over the brew substance to form a top surface of the encapsulated packet; and
  attaching together said first and second layers along the outer periphery thereof to encapsulate said brew substance within said first and second layers;

wherein the first and second layers of heat sensitive film encapsulating the brew substance have different rupture temperatures;
covering the encapsulated brew substance with filter paper to form a subassembly;
disposing said subassembly within the container at a position covering said at least one aperture; and
configuring said container to sit on top of a drinking container to permit liquid to drain into said drinking container from said at least one aperture thereof.

34. The method of claim 33 including the step of securing the subassembly within the container.

35. The method of claim 33 including the steps of: configuring a bottom of the container with a cavity formed to accept the subassembly; and disposing the subassembly at the cavity.

36. The method of claim 33 wherein the step of covering includes:
disposing first and second sheets of filter paper about the encapsulated packet; and
sealing together the first and second sheets at the outer periphery thereof to form the subassembly.

37. Method of making a brewing apparatus, said method comprising the steps of:
configuring a container to store liquid for brewing and to dispense said liquid through at least one aperture therein;
encapsulating a sealed packet of filter paper containing a brew substance with a layer of heat sensitive film, wherein said encapsulating comprises:
covering a top surface of the sealed packet with a first layer of heat sensitive film;
covering a bottom surface of the sealed packet with a second layer of heat sensitive film;
attaching together said first and second layers along the outer periphery thereof to encapsulate said sealed packet within said first and second layers;
wherein the first and second layers of heat sensitive film have different rupture temperatures;
disposing said encapsulated packet within the container at a position covering said at least one aperture; and
configuring said container to sit on top of a drinking container to permit liquid to drain into said drinking container from said at least one aperture thereof.

38. The method of claim 37 including the step of securing the encapsulated packet within the container.

39. The method of claim 37 including the steps of: configuring a bottom of the container with a cavity formed to accept the encapsulated packet; and disposing the encapsulated packet at the cavity.

40. The method of claim 37 wherein the first layer of heat sensitive film has a first rupture temperature; and wherein the second layer of heat sensitive film has a second rupture temperature higher than said first rupture temperature.

41. The method of claim 37 wherein the first layer of heat sensitive film has a rupture temperature of approximately one hundred and sixty degrees Fahrenheit; and wherein the second layer of heat sensitive film has a rupture temperature of approximately one hundred and eighty degrees Fahrenheit.

42. The method of claim 37 including configuring the container with a plurality of feet to prevent the container from slipping off the drinking container when seated on top thereof.

43. The method of claim 37 including configuring the container to permit a nesting of a plurality of containers by disposing one within the other.

44. The method of claim 37 including configuring the container to have a rectangular cross-section tapered from top to bottom.

45. The method of claim 37 including making the container and layer of heat sensitive film with material suitable for microwave heating.

46. Method of making a brewing apparatus, said method comprising the steps of:
configuring a container to store liquid for brewing and to dispense said liquid through at least one aperture therein;
encapsulating a sealed packet of filter paper containing a brew substance with a layer of heat sensitive film, wherein said encapsulating comprises:
covering a top surface of the sealed packet with a first layer of heat sensitive film;
covering a bottom surface of the sealed packet with a second layer of heat sensitive film;
wherein the first and second layers of heat sensitive film have different rupture temperatures;
disposing said encapsulated packet within the container at a position covering said at least one aperture; and
configuring said container to sit on top of a drinking container to permit liquid to drain into said drinking container from said at least one aperture thereof.

47. The method of claim 46 wherein the first layer of heat sensitive film covers the entire top surface of the sealed packet and the second layer of heat sensitive film covers the entire bottom surface of the sealed packet.

48. The method of claim 46 wherein the first layer of heat sensitive film has a first rupture temperature; and wherein the second layer of heat sensitive film has a second rupture temperature higher than said first rupture temperature.

49. The method of claim 46 wherein the first layer of heat sensitive film has a rupture temperature of approximately one hundred and sixty degrees Fahrenheit; and wherein the second layer of heat sensitive film has a rupture temperature of approximately one hundred and eighty degrees Fahrenheit.

* * * * *